(12) United States Patent
Liu et al.

(10) Patent No.: US 11,872,505 B2
(45) Date of Patent: Jan. 16, 2024

(54) SEPARATION DEVICE WITH TWO-STAGE GAS-LIQUID MIXTURE AND CONICAL SPIRAL FIELDS

(71) Applicant: China University of Petroleum (East China), Shandong (CN)

(72) Inventors: Chunhua Liu, Shandong (CN); Ji Chen, Shandong (CN); Zhongxian Hao, Shandong (CN); Xinfu Liu, Shandong (CN); Feng Liu, Shandong (CN); Yongjun Shi, Shandong (CN); Wenhao Sha, Shandong (CN); Hui Cheng, Shandong (CN); Junling Tao, Shandong (CN)

(73) Assignee: CHINA UNIVERSITY OF PETROLEUM (EAST CHINA), Qingdao (CN)

(*) Notice: Subject to any disclaimer, the term of this patent is extended or adjusted under 35 U.S.C. 154(b) by 104 days.

(21) Appl. No.: 17/542,403

(22) Filed: Dec. 4, 2021

(65) Prior Publication Data

US 2023/0082058 A1 Mar. 16, 2023

(30) Foreign Application Priority Data

Sep. 15, 2021 (CN) .......................... 202111082228.6

(51) Int. Cl.
*B01D 46/00* (2022.01)
*B01D 19/00* (2006.01)
(Continued)

(52) U.S. Cl.
CPC ..... *B01D 19/0057* (2013.01); *B01D 19/0063* (2013.01); *B01F 23/29* (2022.01);
(Continued)

(58) Field of Classification Search
CPC ............ B01D 19/0057; B01D 19/0063; B01F 25/45221; B01F 25/43171; B01F 23/39;
(Continued)

(56) References Cited

U.S. PATENT DOCUMENTS 5,209,765 A * 5/1993 Kolpak .................... E21B 43/34
55/459.1
5,256,171 A * 10/1993 Payne ...................... E21B 43/34
95/212

(Continued)

*Primary Examiner* — T. Bennett McKenzie

(57) ABSTRACT

A separation device with two-stage gas-liquid mixture and conical spiral fields is provided. A first-stage uniform mixer performs first-stage gas-liquid crushing and uniform mixing process by an outer micropore ceramic pipe, a middle micropore ceramic pipe and an inner micropore ceramic pipe and crushes large bubbles in the gas-liquid two-phase flow into small bubbles. A second-stage uniform mixer performs second-stage gas-liquid crushing and uniform mixing process. A whirlpool-making gas collector adjusts the gas-liquid uniform mixing flow obtained after two-stage gas-liquid uniform mixing into hollow-core type high-speed two-phase spiral flow. A conical degasser performs gas-liquid efficient separation operation in a high-speed conical spiral field. A two-stage uniform mixing control system and a gas-liquid separation control system automatically regulate and control the flow and the flow pressure of the gas-liquid two-phase flow, the gas-liquid uniform mixing flow and degassed gas flow and degassed liquid flow.

11 Claims, 13 Drawing Sheets

(51) Int. Cl.
*B01F 25/452* (2022.01)
*B01F 23/20* (2022.01)
*B01F 35/221* (2022.01)
*B01F 25/431* (2022.01)
*B01F 35/21* (2022.01)
*E21B 43/34* (2006.01)

(52) U.S. Cl.
CPC .. *B01F 25/43171* (2022.01); *B01F 25/45221* (2022.01); *B01F 35/2113* (2022.01); *B01F 35/21112* (2022.01); *B01F 35/2211* (2022.01); *B01F 35/2213* (2022.01); *E21B 43/34* (2013.01)

(58) Field of Classification Search
CPC .............. B01F 35/2213; B01F 35/2112; B01F 35/2113; B01F 35/2211; E21B 43/34
USPC ........................................................... 96/157
See application file for complete search history.

(56) References Cited

U.S. PATENT DOCUMENTS

| | | | |
|---|---|---|---|
| 5,755,965 A * | 5/1998 | Reiber ...................... | B04C 5/13 210/512.1 |
| 2020/0094168 A1 * | 3/2020 | Sawafuji ............ | B01D 19/0042 |
| 2020/0230527 A1 * | 7/2020 | Bayati ................ | B01D 21/2433 |
| 2020/0284163 A1 * | 9/2020 | Gebhard ................... | F02C 7/32 |

\* cited by examiner

SEPARATION DEVICE WITH TWO-STAGE GAS-LIQUID MIXTURE AND CONICAL SPIRAL FIELDS

CROSS REFERENCE TO RELATED APPLICATION

This patent application claims the benefit and priority of Chinese Patent Application No. 202111082228.6 filed on Sep. 15, 2021, the disclosure of which is incorporated by reference herein in its entirety as part of the present application.

TECHNICAL FIELD

The present disclosure relates to an efficient degasser and a degassing method thereof in the field of oil and gas exploitation, and particularly relates to a dynamic gas-liquid separation device with two-stage gas-liquid uniform mixture, conical spiral fields, and a U-shaped pipe network.

BACKGROUND

At present, a compact type gas-liquid separator, namely a tubular column type gas-liquid separator, has the characteristics of a short retention time of gas-containing well liquid, large handling capacity, high degassing rate, high working pressure, low cost and the like, and gradually replaces a traditional gravity type gas-liquid separator in the field of oil and gas exploitation, especially in the field of ocean oil and gas exploitation.

The separation principle of the traditional gravity type gas-liquid separator is settling separation by gravity, so the separation efficiency is usually low, and the separation precision is usually only 70-100 microns. The tubular column type gas-liquid separator is settling separation by a high-speed rotational flow, so the separation efficiency is very high and the separation precision can reach 10 microns after a mist catching net is arranged. When an equal amount of the gas-containing well liquid is treated, the diameter of the tubular column type gas-liquid separator is only ¼ of that of a conventional horizontal separator, and the operating weight of the prying equipment of the tubular column type gas-liquid separator is only 1/64 of that of the conventional horizontal separator. Accordingly, the tubular column type gas-liquid separator is easy to pry, high in integration degree, and easy to move.

The engineering application of the tubular column type gas-liquid separator is affected by the phenomenon that liquid flow is brought out of an upper pipe cavity, and the degassing efficiency of the tubular column type gas-liquid separator is still limited. As for this, two solutions are adopted at present as follows. One solution is to limit the gas-liquid treatment amount of a single tubular column type gas-liquid separator, so as to prevent the phenomenon that liquid flow is brought out of the upper pipe cavity. The other solution is to lead out a liquid flow film on the pipe wall of the upper pipe body to prevent a large amount of liquid flow from overflowing. However, the above two solutions only temporarily relieve the phenomenon that liquid flow is brought out of the upper pipe cavity, whereas, under the condition that the gas-liquid treatment amount is increased and large fluctuation of the gas and liquid exists, it will beyond the range of safe operating conditions. In addition, a leading-out part of the liquid flow film is additionally arranged on the upper pipe body, which will increase additional structural stress and affect the structural strength and increase potential maintenance cost. Finally, the research on a gas-liquid separator, which is compact, efficient and intelligently controlled, is still in a test stage at present in China.

SUMMARY

In order to overcome the defects and shortcomings of an existing gravity type gas-liquid settling separation method and tubular column type gas-liquid separation liquid flow membrane leading-out method, and to improve the current research situation that the compact, efficient and intelligent control gas-liquid separator in China is still in a test stage, some embodiments aim to provide a separation device with two-stage gas-liquid mixture and conical spiral fields which is suitable for efficient and rapid separation of gas-liquid two-phase flow in the field of oil and gas exploitation. The separation device with two-stage gas-liquid mixture and conical spiral fields can adapt to gas-liquid two-phase flow with different gas contents by a two-stage gas-liquid crushing and uniform mixing process, a conical spiral field dynamic gas-liquid separation process and an on-line control system, so that two-stage gas-liquid uniform mixing and efficient and rapid separation of the gas phase and the liquid phase are remotely and automatically controlled. Furthermore, the flow rates and the flow pressures of the gas-liquid two-phase flow, the gas-liquid uniform mixing flow and the degassed gas flow and the liquid flow are automatically regulated and controlled.

In order to solve the technical problems, some embodiments adopt the technical solution that a separation device with two-stage gas-liquid mixture and conical spiral fields is provided. The separation device with two-stage gas-liquid mixture and conical spiral fields mainly include a first-stage uniform mixer, a second-stage uniform mixer, a whirlpool-making gas collector, a conical degasser, a two-stage uniform mixing control system and a gas-liquid separation control system. The first-stage uniform mixer, the second-stage uniform mixer and the conical degasser are vertically arranged, the second-stage uniform mixer is connected with the conical degasser through the whirlpool-making gas collector. So, the whole separation device is formed into an inverted U-shaped pipe network, the first-stage uniform mixer and the second-stage uniform mixer are connected through a flange and realize two-stage uniform mixing of gas-liquid two-phase flow with different gas contents. The two-stage uniform mixing control system realize remotely automatic control of the processes of first-stage gas-liquid crushing and uniform mixing process and the second-stage gas-liquid crushing and uniform mixing process, the gas-liquid separation control system realize remotely automatic control of the gas-liquid efficient separation in the high-speed conical spiral fields.

The first-stage uniform mixer performs first-stage gas-liquid crushing and uniform mixing process and crushes large bubbles in the gas-liquid two-phase flow into small bubbles by an outer micropore ceramic pipe, a middle micropore ceramic pipe and an inner micropore ceramic pipe. The first-stage uniform mixer includes a first-stage mixing pipe, the outer micropore ceramic pipe, the middle micropore ceramic pipe, the inner micropore ceramic pipe, an upper partition plate, a lower baffle plate, a liquid inlet buffer pipe and a two-phase liquid inlet pipe, the outer micropore ceramic pipe, the middle micropore ceramic pipe and the inner micropore ceramic pipe are arranged in the first-stage mixing pipe, and the upper partition plate, the lower baffle plate, the liquid inlet buffer pipe and the two-phase liquid inlet pipe are arranged from top to bottom.

The two-phase liquid inlet pipe is used for conveying gas-liquid two-phase flow and includes a liquid inlet horizontal pipe section and a liquid inlet vertical pipe section, the liquid inlet horizontal pipe section is horizontally arranged and connected with the liquid inlet vertical pipe section through an elbow, and the liquid inlet vertical pipe section, the liquid inlet buffer pipe and the first-stage mixing pipe are coaxially arranged from bottom to top.

The first-stage mixing pipe is a thick and long pipe, one of the two ends of the first-stage mixing pipe connects the second-stage mixing pipe and the upper partition plate into a whole through flanges, the other one of the two ends of the first-stage mixing pipe connects the lower baffle plate and the liquid inlet buffer pipe into a whole through flanges, the liquid inlet buffer pipe is a thick and short pipe and buffers the gas-liquid two-phase flow, the bottom of the liquid inlet buffer pipe is provided with a lower liquid inlet flange for sealing, a round hole is drilled in the center of the lower liquid inlet flange, and the liquid inlet buffer pipe and the two-phase liquid inlet pipe are connected together by circumferentially welding a lower liquid inlet flange of the liquid inlet buffer pipe and a liquid inlet vertical pipe section of the two-phase liquid inlet pipe.

The axial lengths of the outer micropore ceramic pipe, the middle micropore ceramic pipe and the inner micropore ceramic pipe are equal, the outer micropore ceramic pipe, the middle micropore ceramic pipe and the inner micropore ceramic pipe are coaxially arranged in a layered mode from outside to inside in the radial direction of the of the first-stage mixing pipe, a cylindrical pipe cavity of the inner micropore ceramic pipe and the liquid inlet buffer pipe are kept communicating through a flow guide round hole in the lower baffle plate, an annular cavity between the middle micropore ceramic pipe and the inner micropore ceramic pipe and the second-stage mixing pipe are kept communicating through inner flow guide holes of the upper partition plate, an annular cavity between the outer micropore ceramic pipe and the middle micropore ceramic pipe and the liquid inlet buffer pipe are kept communicating through flow guide holes of the lower baffle plate, and an annular cavity between the first-stage mixing pipe and the outer micropore ceramic pipe and the second-stage mixing pipe are kept communicating through outer flow guide holes of the upper partition plate.

Crushing micropores are formed in the pipe walls of the outer micropore ceramic pipe, the middle micropore ceramic pipe and the inner micropore ceramic pipe in the axial direction at equal intervals between different layers, the crushing micropores on each layer are uniformly distributed in the circumferential direction, each crushing micropore include a large-cone micropore channel, a cylindrical micropore channel and a small-cone micropore channel, the taper of the conical surface of the hole wall of the large-cone micropore channel of each crushing micropore is larger than that of the conical surface of the hole wall of the small-cone micropore channel of the crushing micropore; and the cone height of the conical surface of the hole wall of the large-cone micropore channel, the axial length of the cylindrical surface of the hole wall of the cylindrical micropore channel and the cone height of the conical surface of the hole wall of the small-cone micropore channel are sequentially increased. The small-cone micropore channel of the outer micropore ceramic pipe is arranged on an inner side of the outer micropore ceramic pipe along a radial direction of the outer micropore ceramic pipe, and the small-cone micropore channel of the inner micropore ceramic pipe is arranged on an inner side of the inner micropore ceramic pipe along a radial direction of a the inner micropore ceramic pipe; the small-cone micropore channel of the middle micropore ceramic pipe is arranged on an outer side thereof along a radial direction of the middle micropore ceramic pipe. Annular clamping rings are arranged at the two ends of the outer micropore ceramic pipe and the two ends of the inner micropore ceramic pipe, annular clamping hoops are arranged at the two ends of the middle micropore ceramic pipe, the annular clamping rings of the outer micropore ceramic pipe are matched with the outer one of the annular clamping grooves of the upper partition plate in the radial direction of the upper partition plate and the outer one of the annular clamping grooves of the lower baffle plate in the radial direction of the lower baffle plate; the annular clamping hoops of the middle micropore ceramic pipe are matched with the middle one of the annular clamping grooves of the upper partition plate in the radial direction of the upper partition plate and the middle one of the annular clamping grooves of the lower baffle plate in the radial direction of the lower baffle plate; the annular clamping rings of the inner micropore ceramic pipe are matched with the inner one of the annular clamping grooves of the upper partition plate in the radial direction of the upper partition plate and the inner one of the annular clamping grooves of the lower baffle plate in the radial direction of the lower baffle plate, such that, axial fixation and up-and-down bidirectional limitation of the outer micropore porcelain pipe, the middle micropore porcelain pipe and the inner micropore porcelain pipe are enabled.

The upper partition plate and the lower baffle plate are both circular steel plates, a lower end face of the upper partition plate is milled with annular clamping grooves which are coaxially distributed into three layers in a radial direction of the upper partition plate, and an upper end face of the lower baffle plate is milled with annular clamping grooves which are coaxially distributed into three layers in a radial direction of the lower baffle plate, and the cross sections of the annular clamping grooves are in right trapezoid shapes. The inner flow guide holes of the upper partition plate uniformly distributed in the circumferential direction are formed in the position, located between the annular clamping groove on the inner layer and the annular clamping groove on the middle layer, of the upper partition plate, the outer flow guide holes of the upper partition plate uniformly distributed in the circumferential direction are formed in the position, located on the outer edge of the annular clamping groove on the outer layer, of the upper partition plate, and the communication of the first-stage mixing pipe and the second-stage mixing pipe is achieved through the inner flow guide holes of the upper partition plate and the outer flow guide holes of the upper partition plate. The flow guide round hole is drilled in the center of the lower baffle plate, the flow guide holes of the lower baffle plate uniformly distributed in the circumferential direction are formed in the position, located between the annular clamping groove on the outer layer and the annular clamping groove on the middle layer, of the lower baffle plate, and the communication of the liquid inlet buffer pipe and the first-stage mixing pipe is achieved through the flow guide round hole and the flow guide holes of the lower baffle plate. The outer side walls and the inner side walls in the radial direction of the flow guide holes of the lower baffle plate, the inner flow guide holes of the upper partition plate and the outer flow guide holes of the upper partition plate are all circular arch surfaces, and the two side walls in the circumferential direction of the flow guide holes of the lower baffle plate, the inner flow guide holes of the upper partition plate and the outer flow guide holes of the upper partition plate are all semi-cylindrical surfaces.

The second-stage uniform mixer performs second-stage gas-liquid crushing and uniform mixing process by a uniform mixing gear to form gas-liquid uniform mixing flow with uniformly distributed tiny bubbles. The second-stage uniform mixer includes a second-stage mixing pipe, a uniform mixing gear, an impeller base pipe, a pressure relief pipe and a uniform mixing flow pipe, the uniform mixing gear and the impeller base pipe are arranged in the second-stage mixing pipe, and the pressure relief pipe and the uniform mixing flow pipe are located at the top end of the second-stage uniform mixer and are symmetrically arranged.

The second-stage mixing pipe is a thick and long pipe, an upper uniform mixing flange is arranged on the top of the second-stage mixing pipe for sealing, two round holes are drilled in the outer edge part of the upper uniform mixing flange, where the pressure relief pipe and the uniform mixing flow pipe are both connected together by circumferentially welding an upper uniform mixing flange, which form a whole with the second-stage mixing pipe.

The uniform mixing gear is provided with three-stage uniform mixing teeth, the inner tooth surfaces of the three-stage uniform mixing teeth are fixed on the outer ring surface of the impeller base pipe by circumferential welding, the cylindrical surface where the outer teeth surfaces of the three-stage uniform mixing teeth are located is in interference fit with the inner wall of the second-stage mixing pipe, and therefore the uniform mixing gear and the impeller base pipe are fixed in the second-stage mixing pipe. Each stage of uniform mixing teeth of the uniform mixing gear includes two layers of uniform mixing teeth, each layer of uniform mixing teeth are obliquely arranged, the inclination directions of the two layers which are adjacent of uniform mixing teeth are opposite, the tooth trace of each uniform mixing tooth is a combined curve, the upper half part of the tooth trace of each uniform mixing tooth is an inwards concave arc line, the lower half part of the tooth trace of each uniform mixing tooth is an outwards convex arc line, and an area of a cross-section, which is vertical to the tooth trace, of each of the uniform mixing teeth is gradually increased from zero and then continuously decreased to zero. Such that the gas-liquid two-phase flow after the first-stage gas-liquid crushing and uniform mixing process is continuously sheared and crushed to gradually reduced sizes of the small bubbles, the small bubbles are further crushed into tiny bubbles, and meanwhile, the gas-liquid two-phase flow is continuously reversed to form gas-liquid uniform mixing flow with uniformly distributed tiny bubbles.

The impeller base pipe is an inverted bowl-shaped pipe body with a closed upper end, an annular cavity is formed by the outer ring surface of the impeller base pipe and the inner wall of the second-stage mixing pipe and provided with the uniform mixing gear, and the conical boss is arranged on the top of the impeller base pipe and attached closely to the upper uniform mixing flange, so that axial positioning of the uniform mixing gear and the impeller base pipe is achieved.

Each of the uniform mixing flow pipe and the pressure relief pipe is communicated with a pipe cavity of the second-stage mixing pipe, the uniform mixing flow pipe is a thick pipe and includes a uniform mixing horizontal pipe section and a uniform mixing vertical pipe section, the pressure relief pipe is a thin pipe and includes a pressure relief horizontal pipe section and a pressure relief vertical pipe section, the uniform mixing horizontal pipe section and the pressure relief horizontal pipe section are horizontally arranged, the uniform mixing horizontal pipe section is connected with the uniform mixing vertical pipe section through an elbow, and the pressure relief horizontal pipe section is connected with the pressure relief vertical pipe section through an elbow.

The whirlpool-making gas collector adjusts the gas-liquid uniform mixing flow, which is obtained after the two-stage gas-liquid uniform mixing, into hollow-core type high-speed two-phase spiral flow by a variable-pitch whirlpool-making blade and an upper flow guide conical cover; and the degassed gas flow is collected through a lower gas collecting conical cover, and the whirlpool-making gas collector includes a gas collecting pipe, a whirlpool-making liquid inlet pipe, a variable-pitch whirlpool-making blade and a double-layer conical cover, and the whirlpool-making liquid inlet pipe, the variable-pitch whirlpool-making blade and the double-layer conical cover are arranged on the lower part of the gas collecting pipe.

The whirlpool-making liquid inlet pipe is a long and thin pipe and is obliquely arranged, the diameter of the whirlpool-making liquid inlet pipe is equal to diameter of the uniform mixing flow pipe, the whirlpool-making liquid inlet pipe and the uniform mixing flow pipe are connected through a flange, and a wedge-shaped liquid inlet groove is cut at an outlet of the whirlpool-making liquid inlet pipe.

The variable-pitch whirlpool-making blade is an integrated blade, the inner side surface of the variable-pitch whirlpool-making blade is fixed to the outer ring surface of the gas collecting pipe by circumferential welding, meanwhile, the cylindrical surface where the outer side surface of the variable-pitch whirlpool-making blade is located is in interference fit with the inner wall of the rotational flow forming pipe section, and therefore the variable-pitch whirlpool-making blade is fixed into a conical separation pipe. The outer contour line of the variable-pitch whirlpool-making blade is a variable-pitch spiral line, the pitch of the outer contour line of the variable-pitch whirlpool-making blade is gradually reduced from top to bottom, the included angle between the tangent line of the upper starting point of the outer contour line of the variable-pitch whirlpool-making blade and the horizontal plane is equal to an included angle between the axis of the whirlpool-making liquid inlet pipe and the horizontal plane, and the included angle between the tangent line of the lower ending point of the outer contour line of the variable-pitch whirlpool-making blade and the axis of the conical separation pipe is equal to the taper of the conical surface where the outer ring surface of the upper flow guide conical cover is located. Therefore, the gas-liquid uniform mixing flow tangentially flows into the variable-pitch whirlpool-making blade through the whirlpool-making liquid inlet pipe to form a high-speed rotating spiral flow, then the high-speed rotating spiral flow tangentially flow to the upper flow guide conical cover to form hollow-core type high-speed two-phase spiral flow, and finally, the hollow-core type high-speed two-phase spiral flow is guided to a rotational flow separating pipe section.

The double-layer conical cover is a conical shell and includes an upper flow guide conical cover and a lower gas collecting conical cover, the taper of the conical surface where the inner ring surface and the outer ring surface of the upper flow guide conical cover are located is larger than that of the conical surface where the inner ring surface and the outer ring surface of the lower gas collecting conical cover are located, the upper flow guide conical cover is fixed to the lower part of a gas collecting vertical pipe section by circumferential welding, the top of the upper flow guide conical cover is connected with the lowest part of the variable-pitch whirlpool-making blade, and the lower gas collecting conical cover is fixed to the bottom of the gas collecting vertical pipe section by circumferential welding and arranged at the upper part of a pipe cavity of the rotational flow separating pipe section.

The gas collecting pipe is used for conveying degassed gas flow and includes a gas collecting vertical pipe section and a gas collecting horizontal pipe section, the gas collecting horizontal pipe section is horizontally arranged and connected with the gas collecting vertical pipe section through an elbow, the gas collecting vertical pipe section of the gas collecting pipe, the conical separation pipe, the liquid outlet buffer pipe and the liquid outlet vertical pipe section of the liquid outlet pipe are coaxially arranged from top to bottom, and the lower part of the gas collecting vertical pipe section connects together with the gas collecting pipe and the double-layer conical cover by circumferential welding.

The conical degasser performs the gas-liquid efficient separation in the high-speed conical spiral fields, and includes a conical separation pipe, a flow stabilizing impeller in the conical separation pipe, a liquid outlet buffer pipe and a liquid outlet pipe, and the liquid outlet buffer pipe and the liquid outlet pipe are located on a lower part of the conical degasser.

The conical separation pipe includes a rotational flow forming pipe section, a rotational flow separating pipe section, and an axial flow liquid collecting pipe section connected sequentially from top to bottom in the axial direction, the variable-pitch whirlpool-making blade is arranged in the rotational flow forming pipe section, the inner wall of the rotational flow forming pipe section is a cylindrical surface, a wedge-shaped separation groove is formed in the pipe wall of the rotational flow forming pipe section, and the conical separation pipe is fixed to the whirlpool-making liquid inlet pipe by circumferential welding, and the wedge-shaped separation groove and the wedge-shaped liquid inlet groove are matched to achieve communication between the conical separation pipe and the whirlpool-making liquid inlet pipe; and the inner wall of the rotational flow separating pipe section is an inverted conical surface, the axial flow liquid collecting pipe section is a cylindrical surface, the flow stabilizing impeller is arranged in a lower and middle part of the axial flow liquid collecting pipe section, the cross section of a flow channel of the rotational flow separating pipe section is rapidly shrunk, where the angular momentum of the hollow-core type high-speed two-phase spiral flow is increased, the rotating speed of the hollow-core type high-speed two-phase spiral flow is further increased to form a high-speed conical spiral field, a liquid phase is gradually thrown to the pipe wall of the rotational flow separating pipe section and rotates downwards to flow to the axial flow liquid collecting pipe section, and meanwhile, a gas phase in the high-speed conical spiral field is continuously transported to the center of the rotational flow separating pipe section and rises reversely to converge into a long and thin inverted-cone-shaped gas flow.

An upper separation flange is arranged on the top of the conical separation pipe for sealing, and a round hole is drilled in the center of the upper separation flange, where the gas collecting pipe and the conical separation pipe are connected together by circumferentially welding the gas collecting vertical pipe section and an upper separation flange fixed to the conical separation pipe, and the bottom of the conical separation pipe is connected with the liquid outlet buffer pipe through a flange.

The flow stabilizing impeller includes flow stabilizing blades and an anti-whirl guide rod, degassed liquid flow is adjusted into liquid flow stably flowing in the axial direction, the anti-whirl guide rod is a thin and short rod and used for preventing from generating vortexes, the flow stabilizing blades are straight plate steel sheets uniformly distributed in the circumferential direction, the inner side surfaces of the flow stabilizing blades are fixed to the outer ring surface of the anti-whirl guide rod by circumferential welding, and the cylindrical surface where the outer side blade surfaces of the flow stabilizing blades is located is in interference fit with the inner wall of the axial flow liquid collecting pipe section so that the flow stabilizing impeller is fixed in the conical separation pipe.

The liquid outlet buffer pipe is a thick and short pipe and buffers the degassed liquid flow, the bottom of the liquid outlet buffer pipe is provided with a lower separation flange for sealing, the lower liquid inlet flange, the upper uniform mixing flange, the upper separation flange and the lower separation flange are all blind end flange plates, a round hole is drilled in the center of the lower separation flange, where the liquid outlet pipe and the liquid outlet buffer pipe are connected together by circumferential welding the lower separation flange provided on the liquid outlet buffer pipe and a liquid outlet vertical pipe section of the liquid outlet pipe. The liquid outlet pipe is used for conveying the degassed liquid flow and includes a liquid outlet horizontal pipe section and a liquid outlet vertical pipe section, and the liquid outlet horizontal pipe section is horizontally arranged and connected with the liquid outlet vertical pipe section through an elbow.

The two-stage uniform mixing control system and the gas-liquid separation control system automatically regulate and control the flow rates and the flow pressures of the gas-liquid two-phase flow, the gas-liquid uniform mixing flow and degassed gas flow and degassed liquid flow. Pressure relief valves are arranged on the pipe walls of the pressure relief pipe and the conical separation pipe and are used for automatically releasing the pressure of each pipe cavity under the overpressure working condition.

In the two-stage uniform mixing control system, a two-phase liquid inlet manifold is sequentially provided with an electromagnetic flowmeter, an emergency shut-off valve and a pneumatic pressure control valve, the electromagnetic flowmeter transmits a measured total flow signal of the gas-liquid two-phase flow to an accumulated flow display instrument through a flow transmitter of the electromagnetic flowmeter, so as to enable accurate metering of the gas-liquid two-phase flow. The emergency shut-off valve is in a normally open state and automatically closes and stops supply of gas-liquid two-phase flow when an ultrahigh pressure signal appears and the system breaks down.

In the two-stage uniform mixing control system, each of the first-stage mixing pipe and the uniform mixing flow pipe is provided with a pressure transmitter, the two pressure transmitters monitor the pressure conditions of the first-stage mixing pipe and the uniform mixing flow pipe respectively, conversion between pressure signals and electric signals and data processing are completed through a pressure indication controller and a pressure converter, and finally the flow of the gas-liquid two-phase flow is automatically regulated and controlled through the pneumatic pressure control valve of the two-phase liquid inlet manifold.

In the gas-liquid separation control system, a liquid outlet manifold is respectively provided with a pneumatic liquid level control valve and an ultrasonic liquid flowmeter, the ultrasonic liquid flowmeter transmits measured flow signals of the degassed liquid flow to an instantaneous flow display instrument and the accumulated flow display instrument through a flow transmitter of the ultrasonic liquid flowmeter, and so as to enable accurate metering of the degassed liquid flow. The axial flow liquid collecting pipe section is provided with a liquid level transmitter, the liquid level transmitter monitors the liquid level condition in the conical separation pipe, conversion and data processing between liquid level signals and electric signals are completed through the liquid level converter, and finally the flow of the degassed liquid flow is automatically regulated and controlled through the pneumatic liquid level control valve of the liquid outlet manifold.

In the gas-liquid separation control system, a gas conveying manifold is respectively provided with a pneumatic pressure difference control valve and an ultrasonic gas flowmeter, the ultrasonic gas flowmeter transmits measured flow, pressure and temperature signals of the degassed gas flow to the instantaneous flow display instrument and the accumulated flow display instrument through a flow transmitter, a pressure transmitter and a temperature transmitter of the ultrasonic gas flowmeter respectively, so as to enable accurate metering of the degassed gas flow. Each of the liquid outlet manifold and the gas collecting pipe is provided with a pressure transmitter, the whirlpool-making liquid inlet pipe is provided with two pressure difference transmitters, the two pressure transmitters of the liquid outlet manifold and the gas collecting pipe and the two pressure difference transmitters simultaneously monitor the pressure difference condition between the gas collecting pipe and the whirlpool-making liquid inlet pipe and the pressure difference condition between the liquid outlet pipe and the whirlpool-making liquid inlet pipe, conversion and data processing between pressure difference signals and gas signals are completed through a pressure difference indication controller and a pressure difference type gas-electric converter, the pneumatic quantity of a pneumatic pressure difference control valve on the gas conveying manifold is automatically controlled, and then the flow of the degassed gas flow is automatically adjusted.

Some embodiments have the beneficial effects as follows. The separation device with two-stage gas-liquid mixture and conical spiral fields realizes remotely automatic control of two-stage gas-liquid uniform mixing as well as efficient and rapid separation of the gas phase and the liquid phase. The first-stage uniform mixer performs first-stage gas-liquid crushing and uniform mixing process by the outer micropore ceramic pipe, the middle micropore ceramic pipe and the inner micropore ceramic pipe, and crushes large bubbles in the gas-liquid two-phase flow into small bubbles. The second-stage uniform mixer performs second-stage gas-liquid crushing and uniform mixing process by the uniform mixing gear to form gas-liquid uniform mixing flow with uniformly distributed tiny bubbles. The whirlpool-making gas collector adjusts the gas-liquid uniform mixing flow obtained after two-stage gas-liquid uniform mixing into hollow-core type high-speed two-phase spiral flow by the variable-pitch whirlpool-making blade and the double-layer conical cover. The conical degasser performs gas-liquid efficient separation process in the high-speed conical spiral fields. The two-stage uniform mixing control system and the gas-liquid separation control system automatically regulate and control the flow rates and the flow pressures of the gas-liquid two-phase flow, the gas-liquid uniform mixing flow and the degassed gas flow and the liquid flow.

BRIEF DESCRIPTION OF THE DRAWINGS

The description of the present disclosure is further described in conjunction with the figures, but the present disclosure is not limited to the following embodiments.

Reference signs: 1 first-stage uniform mixer; 2 second-stage uniform mixer; 3 whirlpool-making gas collector; 4 conical degasser; 5 gas-liquid separation control system; 6 two-stage uniform mixing control system; 7 upper partition plate; 8 inner micropore ceramic pipe; 9 middle micropore ceramic pipe; 10 outer micropore ceramic pipe; 11 first-stage mixing pipe; 12 lower baffle plate; 13 liquid inlet buffer pipe; 14 two-phase liquid inlet pipe; 15 annular clamping ring; 16 annular clamping hoop; 17 small-cone micropore channel; 18 cylindrical micropore channel; 19 large-cone micropore channel; 20 crushing micropore; 21 outer flow guide hole of the upper partition plate; 22 annular clamping groove; 23 inner flow guide hole of the upper partition plate; 24 flow guide hole of the lower baffle plate; 25 flow guide round hole; 26 impeller base pipe; 27 uniform mixing gear; 28 second-stage mixing pipe; 29 uniform mixing flow pipe; 30 pressure relief pipe; 31 three-stage uniform mixing tooth; 32 uniform mixing tooth; 33 conical boss; 34 gas collecting pipe; 35 whirlpool-making liquid inlet pipe; 36 variable-pitch whirlpool-making blade; 37 double-layer conical cover; 38 lower gas collecting conical cover; 39 upper flow guide conical cover; 40 wedge-shaped liquid inlet groove; 41 conical separation pipe; 42 flow stabilizing impeller; 43 liquid outlet buffer pipe; 44 liquid outlet pipe; 45 flow stabilizing blade; 46 anti-whirl guide rod; 47 axial flow liquid collecting pipe section; 48 rotational flow separating pipe section; 49 rotational flow forming pipe section; 50 wedge-shaped separation groove; 51 electromagnetic flowmeter; 52 emergency shut-off valve; 53 pneumatic pressure control valve; 54 two-phase liquid inlet manifold; 55 pressure relief valve; 56 pneumatic liquid level control valve; 57 liquid outlet manifold; 58 ultrasonic liquid flowmeter; 59 pneumatic pressure difference control valve; 60 gas conveying manifold 60; and 61 ultrasonic gas flowmeter.

DETAILED DESCRIPTION OF THE EMBODIMENTS

Figure 1:
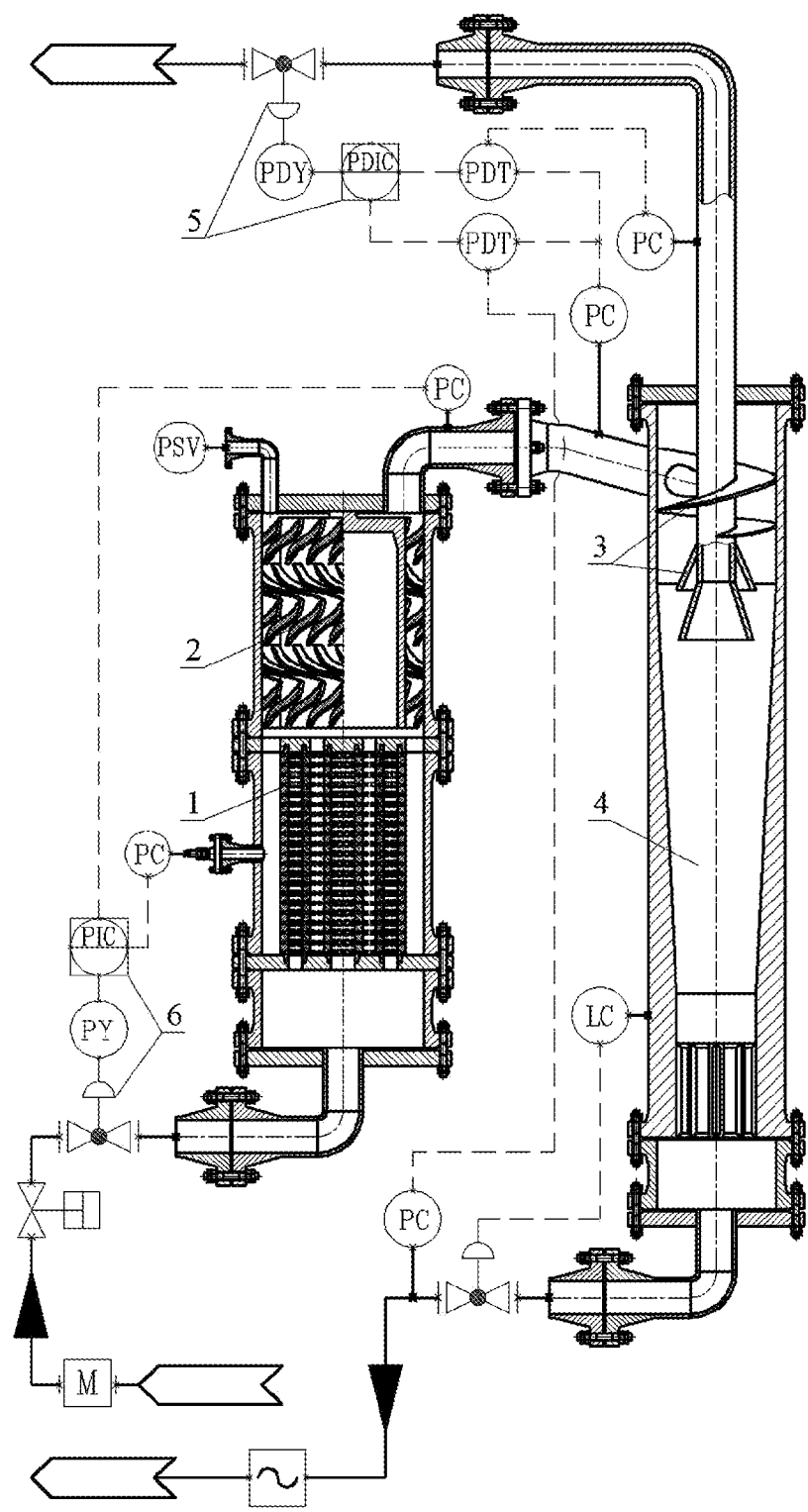
FIG. 1 is a structural diagram of a separation device with two-stage gas-liquid mixture and conical spiral fields according to the present disclosure.
Figure 2:
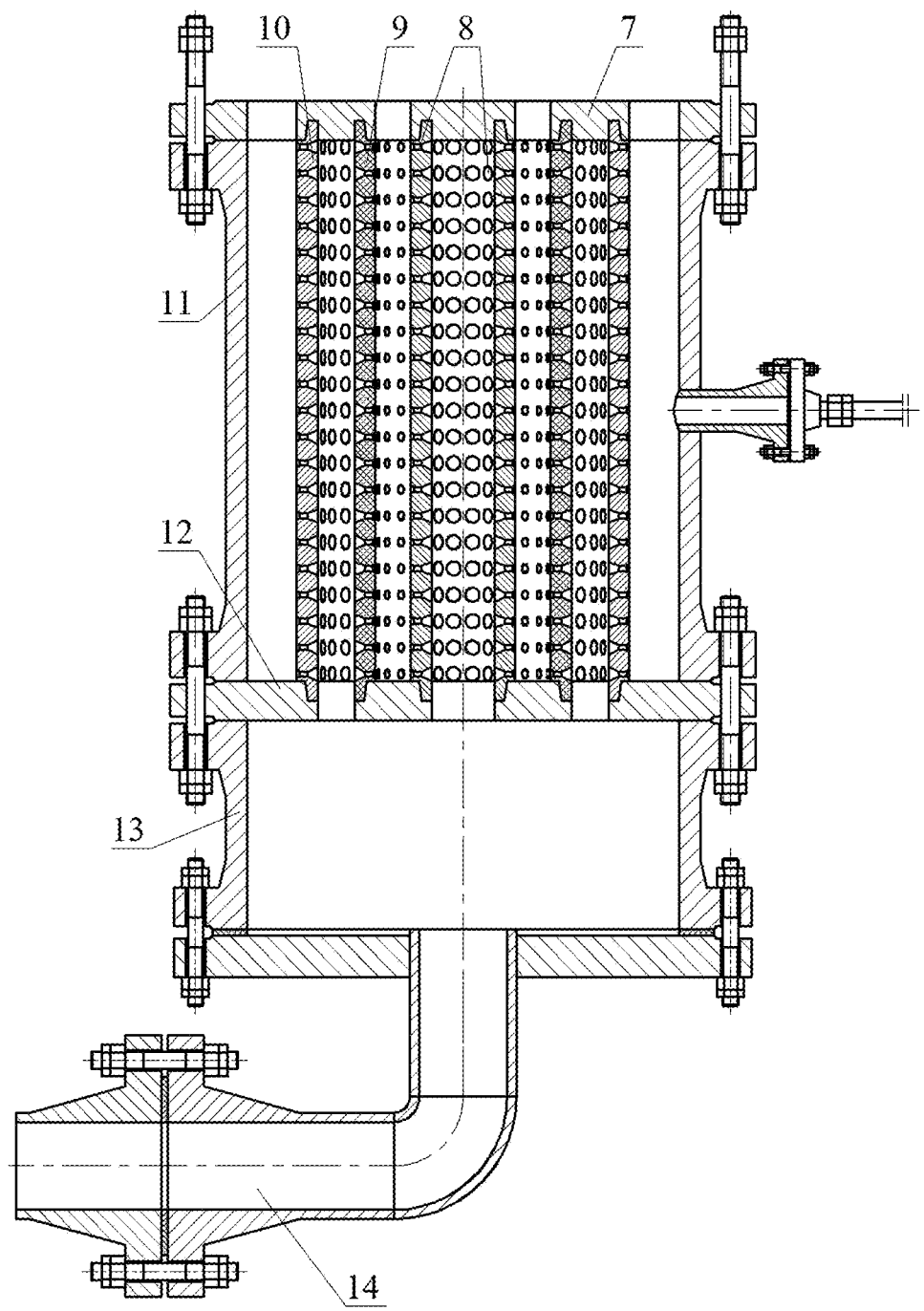
FIG. 2 is a structural diagram of a first-stage uniform mixer of a separation device with two-stage gas-liquid mixture and conical spiral fields.
Figure 3:
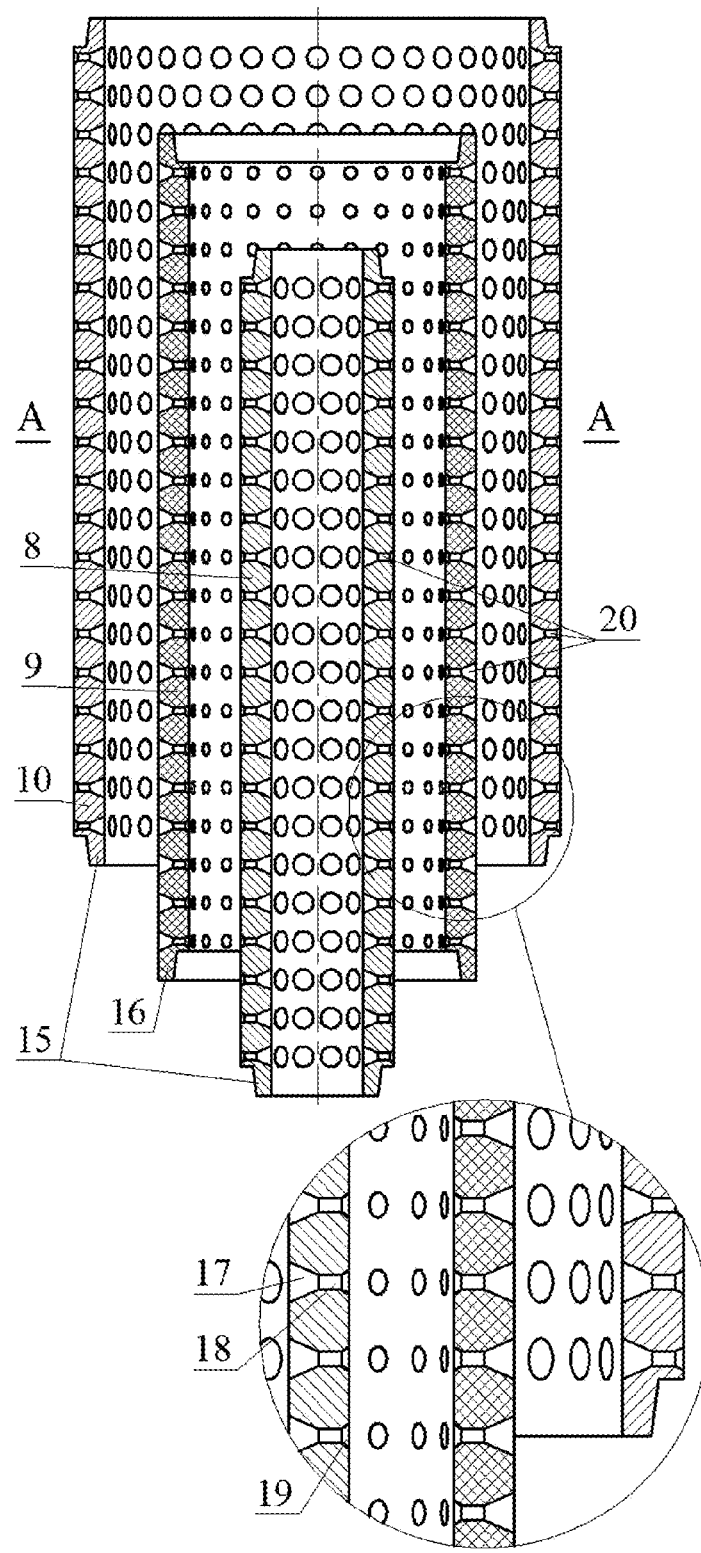
FIG. 3 is a structural diagram of an outer micropore ceramic pipe, a middle micropore ceramic pipe, and an inner micropore ceramic pipe of the first-stage uniform mixer.
Figure 4:
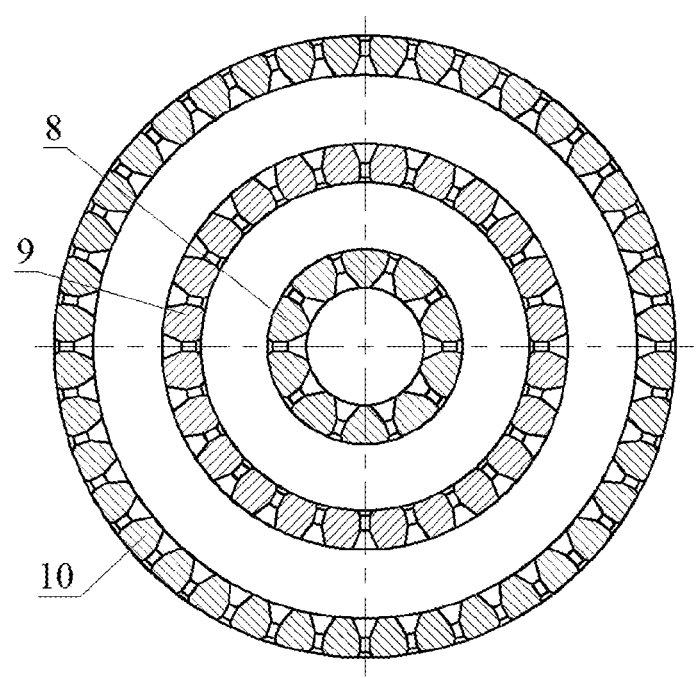
FIG. 4 is a section view taken along a line A-A of FIG. 3.
Figure 5:
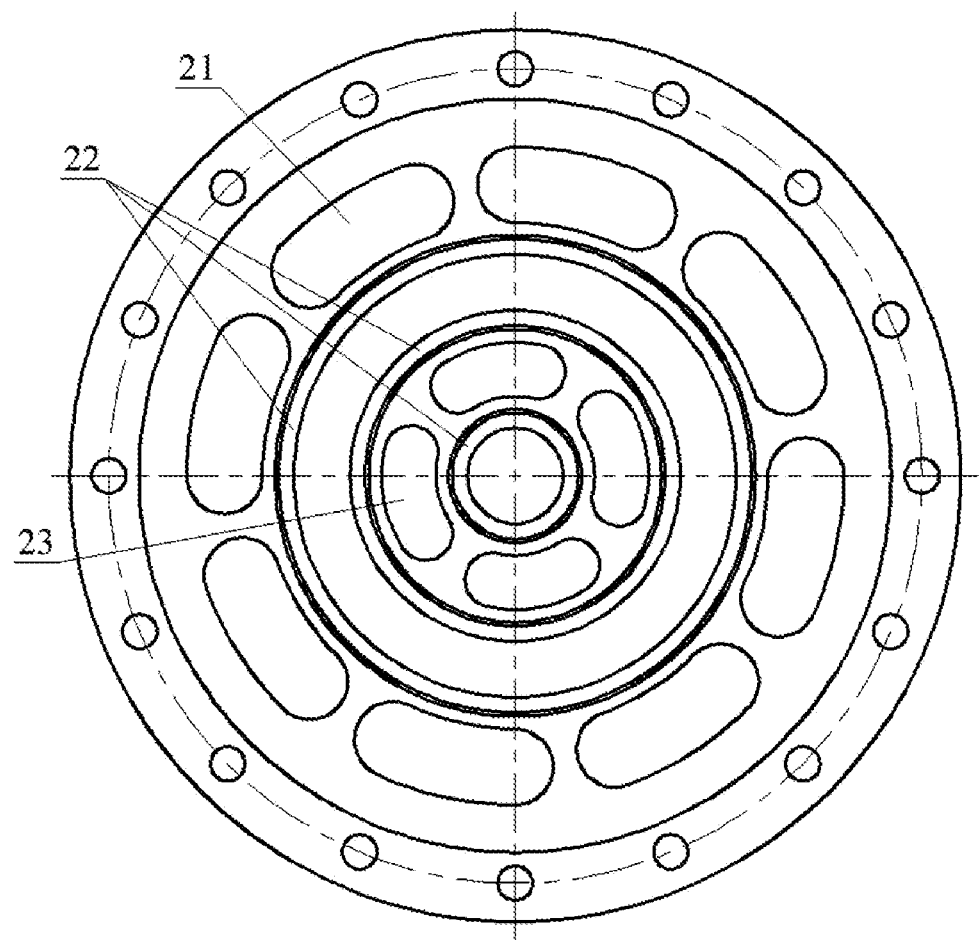
FIG. 5 is a bottom view of an upper partition plate of a first-stage uniform mixer.
Figure 6:
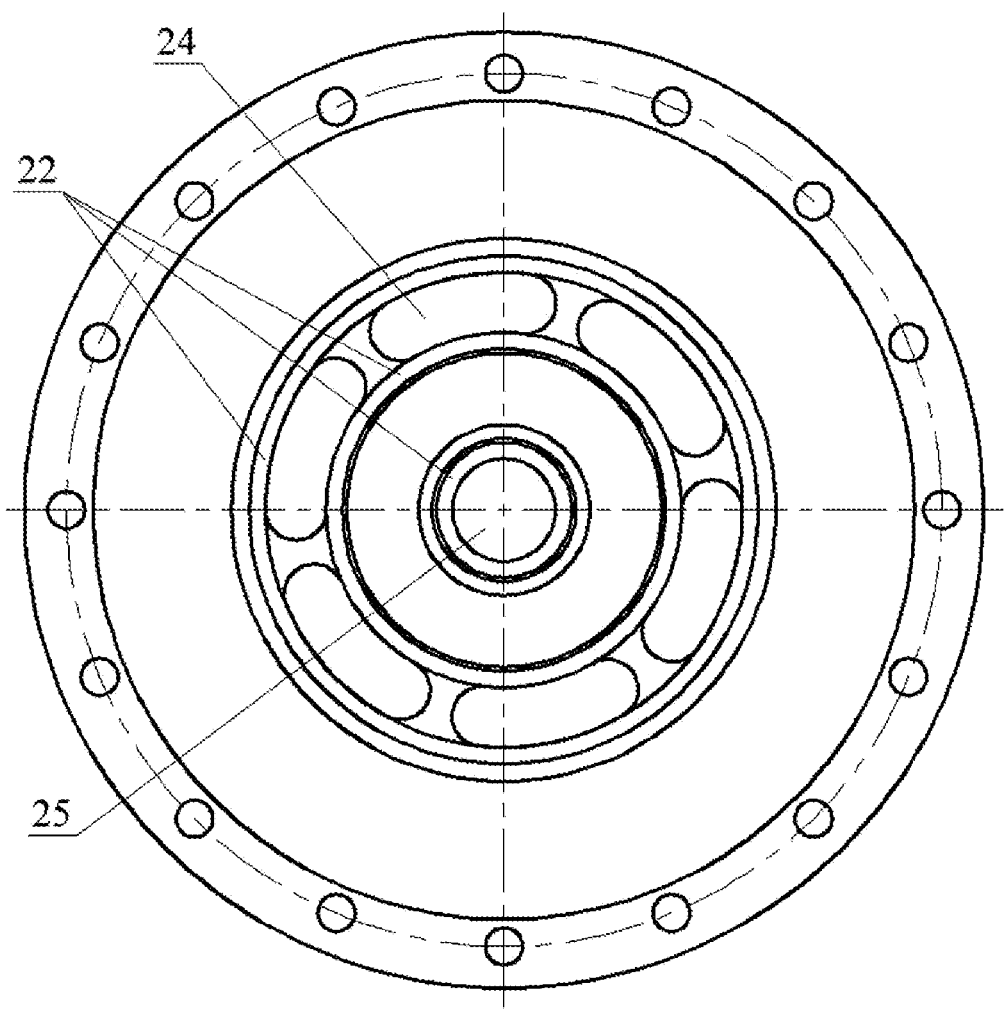
FIG. 6 is a top view of a lower baffle plate of the first-stage uniform mixer.

In FIG. 1, a separation device with two-stage gas-liquid mixture and conical spiral fields includes a first-stage uniform mixer 1, a second-stage uniform mixer 2, a whirlpool-making gas collector 3, a conical degasser 4, a two-stage uniform mixing control system 5 and a gas-liquid separation control system 6. The separation device is capable of adapting to gas-liquid two-phase flow with different gas contents by a two-stage gas-liquid crushing and uniform mixing process and a conical spiral field dynamic gas-liquid separation process and an on-line control system thereof, so that two-stage gas-liquid uniform mixing and efficient and rapid separation of the gas phase and the liquid phase are remotely and automatically controlled.

In FIG. 1, the first-stage uniform mixer 1, the second-stage uniform mixer 2 and the conical degasser 4 are vertically arranged. The second-stage uniform mixer 2 is connected with the conical degasser 4 through the whirlpool-making gas collector 3. So, the whole separation device is formed into an inverted U-shaped pipe network. The first-stage uniform mixer 1 and the second-stage uniform mixer 2 are connected through a flange and realize two-stage uniform mixing of gas-liquid two-phase flow with different gas contents. The two-stage uniform mixing control system 6 realizes remote automatic control of the first-stage gas-liquid crushing and uniform mixing process and the second-stage gas-liquid crushing and uniform mixing process, and the gas-liquid separation control system 5 realizes remote automatic control of the gas-liquid efficient separation in the high-speed conical spiral fields.

In FIG. 2 to FIG. 6, a two-phase liquid inlet pipe 14 is connected with a liquid inlet buffer pipe 13 are connected together by circumferentially welding a lower liquid inlet flange and a liquid inlet vertical pipe section. The pipe cavity volumes of a first-stage mixing pipe 11 and the liquid inlet buffer pipe 13 and the number of layers, the total number and the size of crushing micropores 20 are all needed to be designed by considering the flow rate, the gas content, viscosity and other factors of the gas-liquid two-phase flow. One end of the first-stage mixing pipe 11 is configured for connecting a second-stage mixing pipe and an upper partition plate 7 through a flange, and the other end of the first-stage mixing pipe is configured to connect the second-stage mixing pipe to a lower baffle plate 12 and the liquid inlet buffer pipe 13 through a flange. The annular clamping ring 15 and the annular clamping hoop 16 are matched with the respective annular clamping grooves 22 to achieve axial fixation and up-and-down two-way limitation of the inner micropore ceramic pipe 8, the middle micropore ceramic pipe 9 and the outer micropore ceramic pipe 10. The first-stage mixing pipe 11, the liquid inlet buffer pipe 13 and the second-stage mixing pipe are kept communicating through outer flow guide holes 21 of the upper partition plate 7, inner flow guide holes 23 of the upper partition plate 7, flow guide holes 24 of the lower baffle plate 12, and a flow guide round hole 25 of the lower baffle plate 12.

In FIG. 2 to FIG. 6, the first-stage uniform mixer 1 performs first-stage gas-liquid crushing and uniform mixing process by the inner micropore ceramic pipe 8, the middle micropore ceramic pipe 9 and the outer micropore ceramic pipe 10. The process is as follows. Gas-liquid two-phase flow enters the liquid inlet buffer pipe 13 through the two-phase liquid inlet pipe 14 for buffering; then the gas-liquid two-phase flow enters a cylindrical pipe cavity of the inner micropore ceramic pipe 8 and an annular cavity between the middle micropore ceramic pipe 9 and the outer micropore ceramic pipe 10 through the flow guide round hole 25 and flow guide holes 24 of the lower baffle plate 12, respectively; after the gas-liquid two-phase flow sequentially passes through large-cone micropore channels 19, cylindrical micropore channels 18 and small-cone micropore channels 17, large bubbles are crushed into small bubbles and flow into the annular cavity between the inner microporous ceramic pipe 8 and the middle microporous ceramic pipe 9 and an annular cavity between the first-stage mixing pipe 11 and the outer microporous ceramic pipe 10; and finally the gas-liquid two-phase flow enters the second-stage uniform mixer 2 through the outer flow guide holes 21 of the upper partition plate 7 and the inner flow guide holes 23 of the upper partition plate 7.

Figure 7:
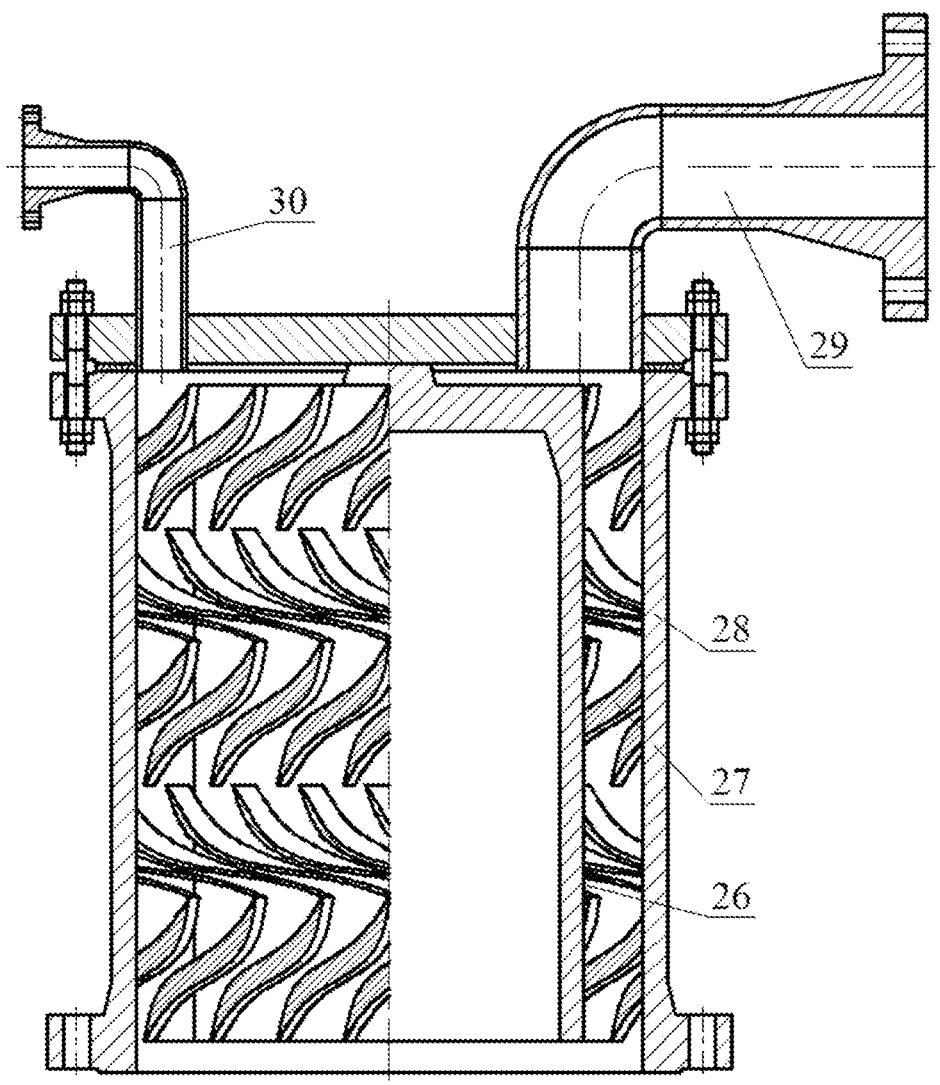
FIG. 7 is a structural diagram of a second-stage uniform mixer of a separation device with two-stage gas-liquid mixture and conical spiral fields.
Figure 8:
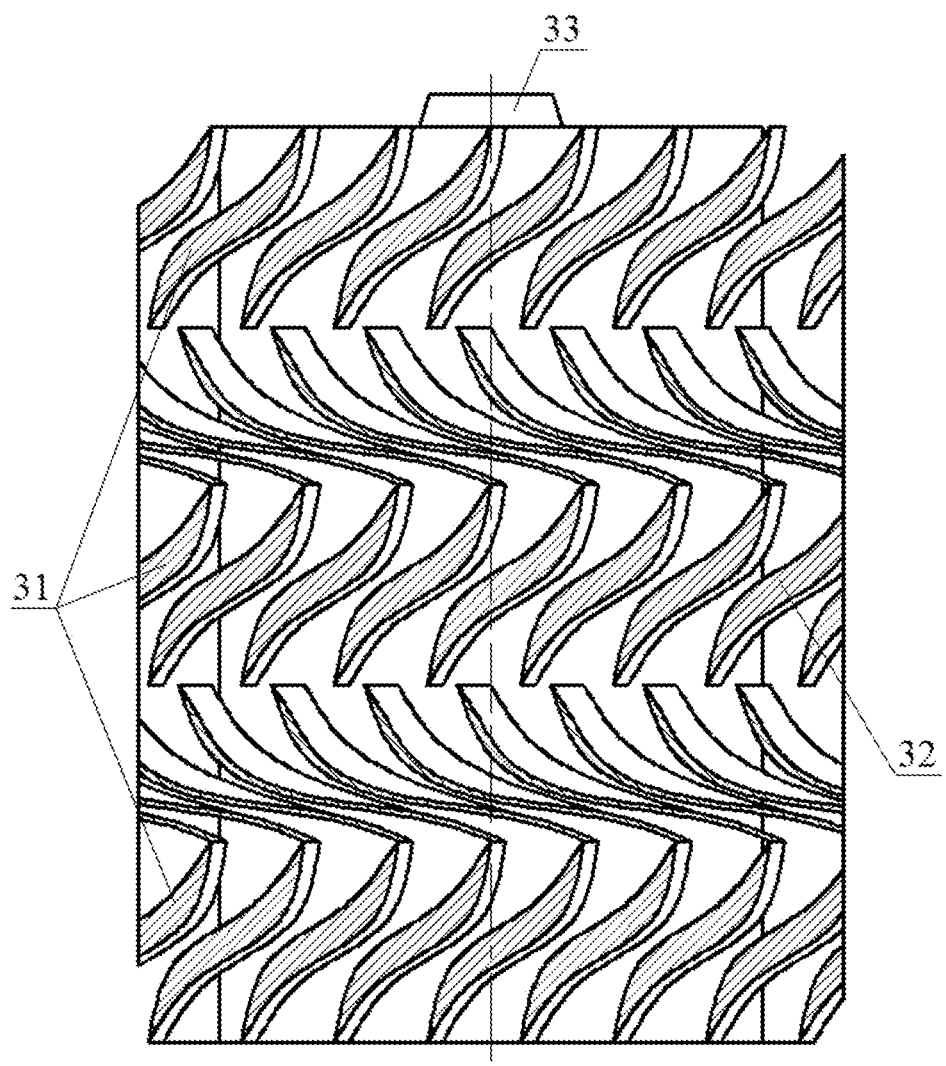
FIG. 8 is a structural diagram of a uniform mixing gear and an impeller base pipe of the second-stage uniform mixer.

In FIG. 7 and FIG. 8, a uniform mixing flow pipe 29 and a pressure relief pipe 30 are connected together with the second-stage mixing pipe 28 by circumferential welding. Three-stage uniform mixing teeth 31 are fixed to an impeller base pipe 26 by circumferential welding, and the impeller base pipe 26 and a uniform mixing gear 27 are fixed into the second-stage mixing pipe 28 by interference fit. Axial positioning of the impeller base pipe 26 and the uniform mixing gear 27 is achieved through a conical boss 33. Factors of flow, gas content, viscosity and the like of gas-liquid two-phase flow need to be considered in the design of a pipe cavity volume of the second-stage mixing pipe 28 and the design of the number and size of the uniform mixing teeth 32.

In FIG. 7 and FIG. 8, the second-stage uniform mixer 2 performs second-stage gas-liquid crushing and uniform mixing process by the uniform mixing gear 27. The process is as follows. The gas-liquid two-phase flow after the first-stage gas-liquid crushing and uniform mixing process passes through the three-stage uniform mixing teeth 31 in an annular cavity between the impeller base pipe 26 and the second-stage mixing pipe 28, wherein the cross-sectional area of each uniform mixing tooth 32 is gradually increased from zero and then continuously decreased to zero; the gas-liquid two-phase flow is continuously sheared and crushed, so that the size of the bubbles is gradually reduced, and the small bubbles are further crushed into tiny bubbles; meanwhile, the cross-sectional area of the flow channel for the gas-liquid two-phase flow is gradually reduced and then continuously increased; and the gas-liquid two-phase flow is continuously reversed, so that gas-liquid uniform mixing flow with uniformly distributed tiny bubbles is finally formed.

Figure 9:
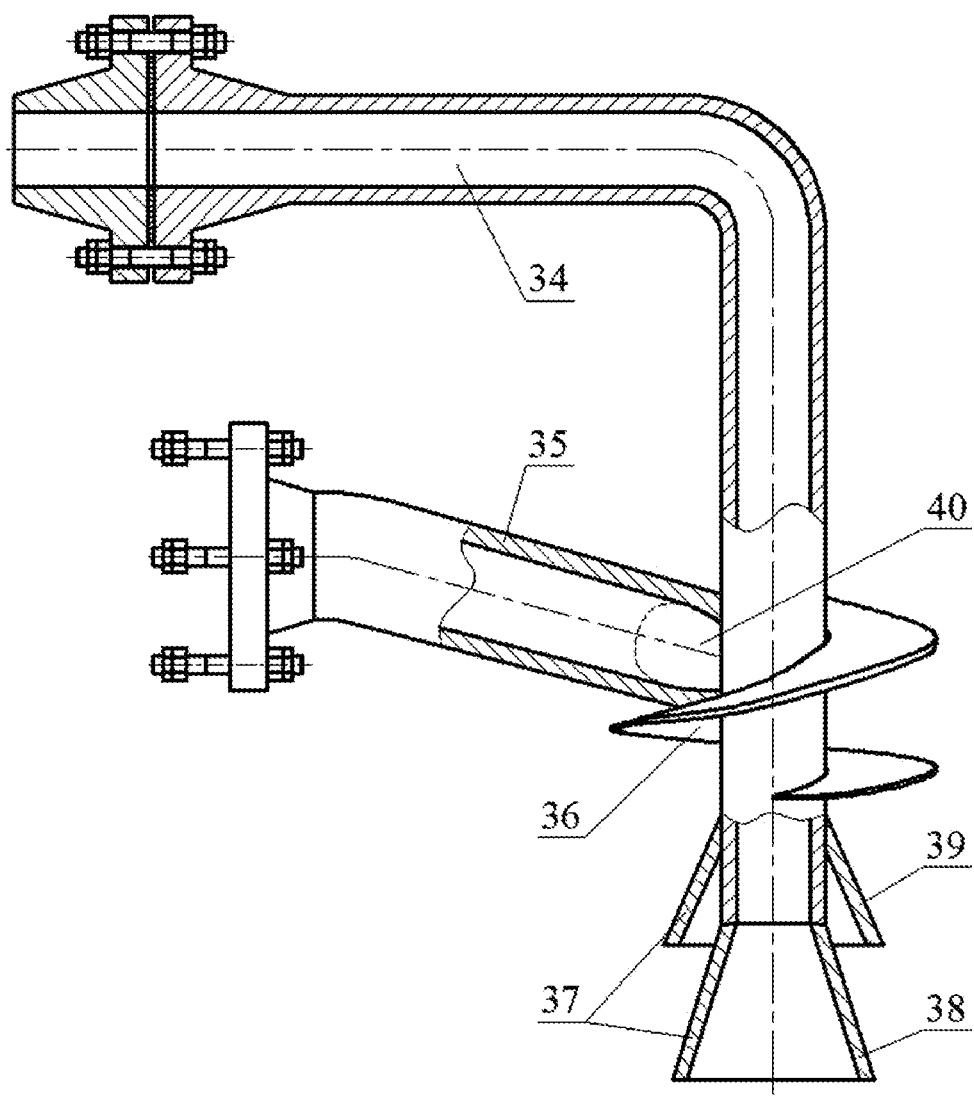
FIG. 9 is a structural diagram of a whirlpool-making gas collector of a separation device with two-stage gas-liquid mixture and conical spiral fields.

In FIG. 9, the whirlpool-making gas collector 3 collects degassed gas flow through the lower gas collecting conical cover 38. A wedge-shaped liquid inlet groove 40 is cut at an outlet of the whirlpool-making liquid inlet pip 35 and the whirlpool-making liquid inlet pipe 35 is connected with the uniform mixing flow pipe 29 through a flange. A variable-pitch whirlpool-making blade 36 and a double-layer conical cover 37 are fixed to a gas collecting vertical pipe section of the gas collecting pipe 34 by circumferential welding. The variable-pitch whirlpool-making blade 36 is fixed in a conical separation pipe of the conical degasser 4 by interference fit. The flow, the gas content, the viscosity and other factors of gas-liquid uniform mixing flow need to be considered to design the pitch and the total length of the outer contour line of the variable-pitch whirlpool-making blade 36. The factors such as flow, flow pressure and the like of degassed air flow need to be considered to design the pipe diameter of the gas collecting pipe 34, and the pipe diameter of the whirlpool-making liquid inlet pipe 35 is consistent with the pipe diameters of the two-phase liquid inlet pipe 14 and the uniform flow mixing pipe 29.

In FIG. 9, the whirlpool-making gas collector 3 adjusts gas-liquid uniform mixing flow into hollow-core type high-speed two-phase spiral flow by the variable-pitch whirlpool-making blade 36 and an upper flow guide conical cover 39. The process is as follows. The gas-liquid uniform mixing flow after two-stage gas-liquid uniform mixing flows through the uniform mixing flow pipe 29 and the whirlpool-making liquid inlet pipe 35 and then tangentially flows into the variable-pitch whirlpool-making blade 36 through the wedge-shaped liquid inlet groove 40, wherein the pitch of the outer contour line of the variable-pitch whirlpool-making blade 36 is gradually reduced from top to bottom to form high-speed rotating spiral flow; then, the high-speed rotating spiral flow tangentially flows to the upper flow guide conical cover 39 to form hollow-core type high-speed two-phase spiral flow; and finally, the hollow-core type high-speed two-phase spiral flow is guided to a rotational flow separating pipe section.

Figure 10:
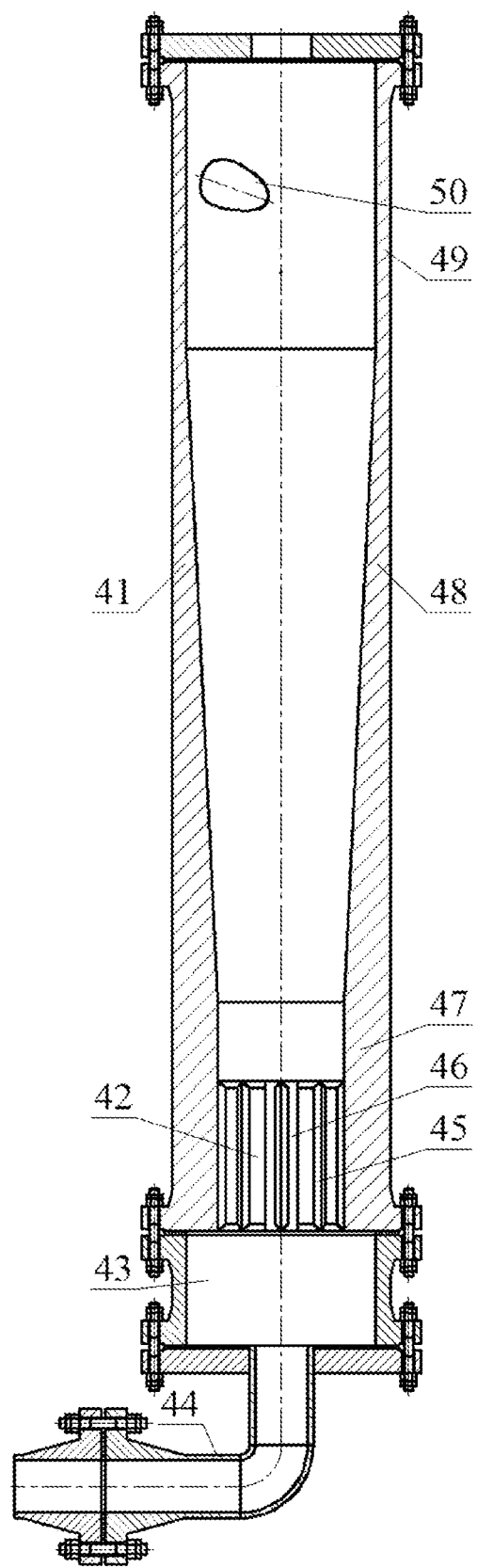
FIG. 10 is a structural diagram of a conical degasser of a separation device two-stage gas-liquid mixture and conical spiral fields.
Figure 11:
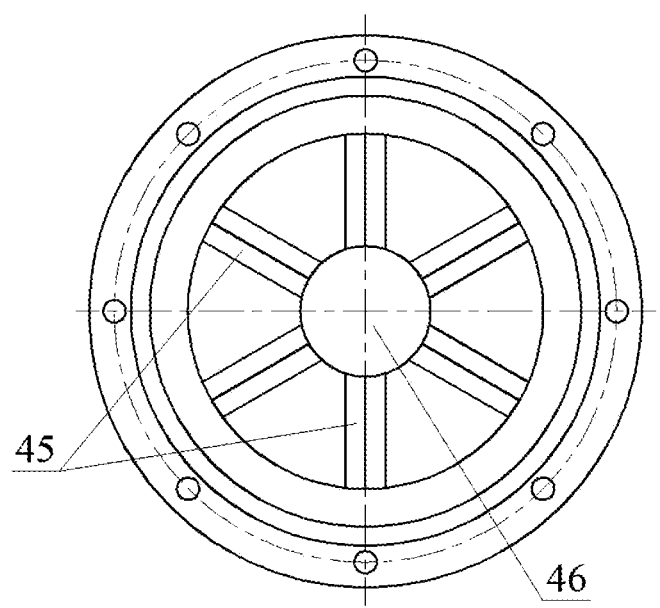
FIG. 11 is a structural diagram of a flow stabilizing impeller of the conical degasser.

In FIG. 10 and FIG. 11, the conical separation pipe 41 is connected with a liquid outlet buffer pipe 43 through a flange. The conical separation pipe 41 and the gas collecting pipe 34 are connected together by circumferentially welding an upper separation flange and the gas collecting vertical pipe section. The whirlpool-making liquid inlet pipe 35 is fixed to a rotational flow forming pipe section 49 by circumferential welding. A wedge-shaped separation groove 50 and the wedge-shaped liquid inlet groove 40 are matched to achieve communication between the conical separation pipe 41 and the whirlpool-making liquid inlet pipe 35. Flow stabilizing blades 45 are fixed to an anti-whirl guide rod 46 by circumferential welding. A flow stabilizing impeller 42 is fixed in an axial flow liquid collecting pipe section 47 by interference fit. The liquid outlet buffer pipe 43 and a liquid outlet pipe 44 are connected together by circumferentially welding a lower separation flange and a liquid outlet vertical pipe section. Factors such as flow, gas content, viscosity and the like of gas-liquid uniform mixing flow need to be considered to design the pipe cavity volume of the conical separation pipe 41 and the taper of an inverted conical surface of the inner wall of the rotational flow separating pipe section 48. Factors such as flow, flow pressure and the like of degassed liquid flow need to be considered to design the pipe diameter of the liquid outlet pipe 44.

In FIG. 10 and FIG. 11, the conical degasser 4 performs gas-liquid efficient separation in the high-speed conical spiral field. The process is as follows. The hollow-core type high-speed two-phase spiral flow enters the rotational flow separating pipe section 48 through the upper flow guide conical cover 39, and the cross section of a flow channel of the rotational flow separating pipe section 48 is rapidly shrunk. The angular momentum of the hollow-core type high-speed two-phase spiral flow is increased, and the rotating speed of the hollow-core type high-speed two-phase spiral flow is further increased to form a high-speed conical spiral field. A liquid phase is gradually thrown to the pipe wall of the rotational flow separating pipe section 48 and rotates downwards to flow to the axial flow liquid collecting pipe section 47. Then, the degassed liquid flow is adjusted to be axially and stably flowing liquid flow by the flow stabilizing blades 45 and the anti-whirl guide rod 46, then flows into the liquid outlet buffer pipe 43 to be buffered and is discharged through the liquid outlet pipe 44. Meanwhile, a gas phase in the high-speed conical spiral field is continuously transported to the center of the rotational flow separating pipe section 48 and rises reversely to converge into a long and thin inverted-cone-shaped gas flow. Finally, the degassed gas flow is collected by the lower gas collecting conical cover 38 and is discharged by the gas collecting pipe 34.

Figure 12:
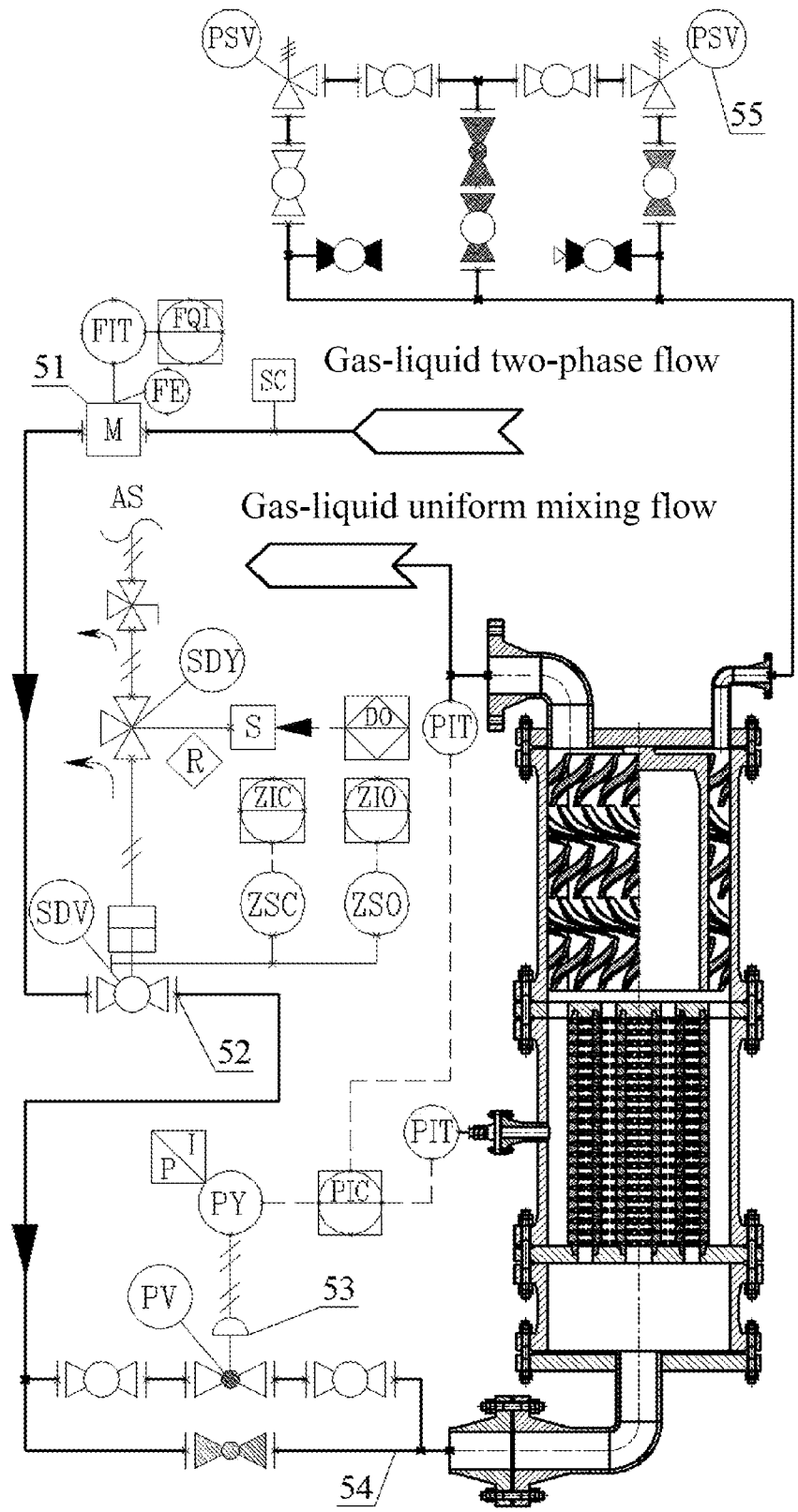
FIG. 12 is a pipeline and instrument control diagram of a two-stage uniform mixing control system of a separation device with two-stage gas-liquid mixture and conical spiral fields.

In FIG. 12, the pipeline and instrument control method of the two-stage uniform mixing control system 6 includes the steps as follows. A flow transmitter (FIT) of a two-phase liquid inlet manifold 54 transmits a total flow signal of gas-liquid two-phase flow measured by an electromagnetic flowmeter 51 to an accumulated flow display instrument (FQI). When an ultrahigh pressure signal appears and the system breaks down, an emergency shut-off valve 52 is automatically closed, supply of the gas-liquid two-phase flow is stopped, and a pressure relief valve 55 on the pressure relief pipe 30 automatically releases pressure in pipe cavities of the first-stage mixing pipe 11 and the second-stage mixing pipe 28 under the overpressure working condition. Two pressure transmitters (PIT) monitor the pressure conditions of the first-stage mixing pipe 11 and the uniform mixing flow pipe 29, respectively. Conversion between pressure signals and electric signals and data processing are completed through a pressure indication controller (PIC) and a pressure converter (PY). Finally, the flow of the gas-liquid two-phase flow is automatically regulated and controlled through the pneumatic pressure control valve 53 of the two-phase liquid inlet manifold 54.

Figure 13:
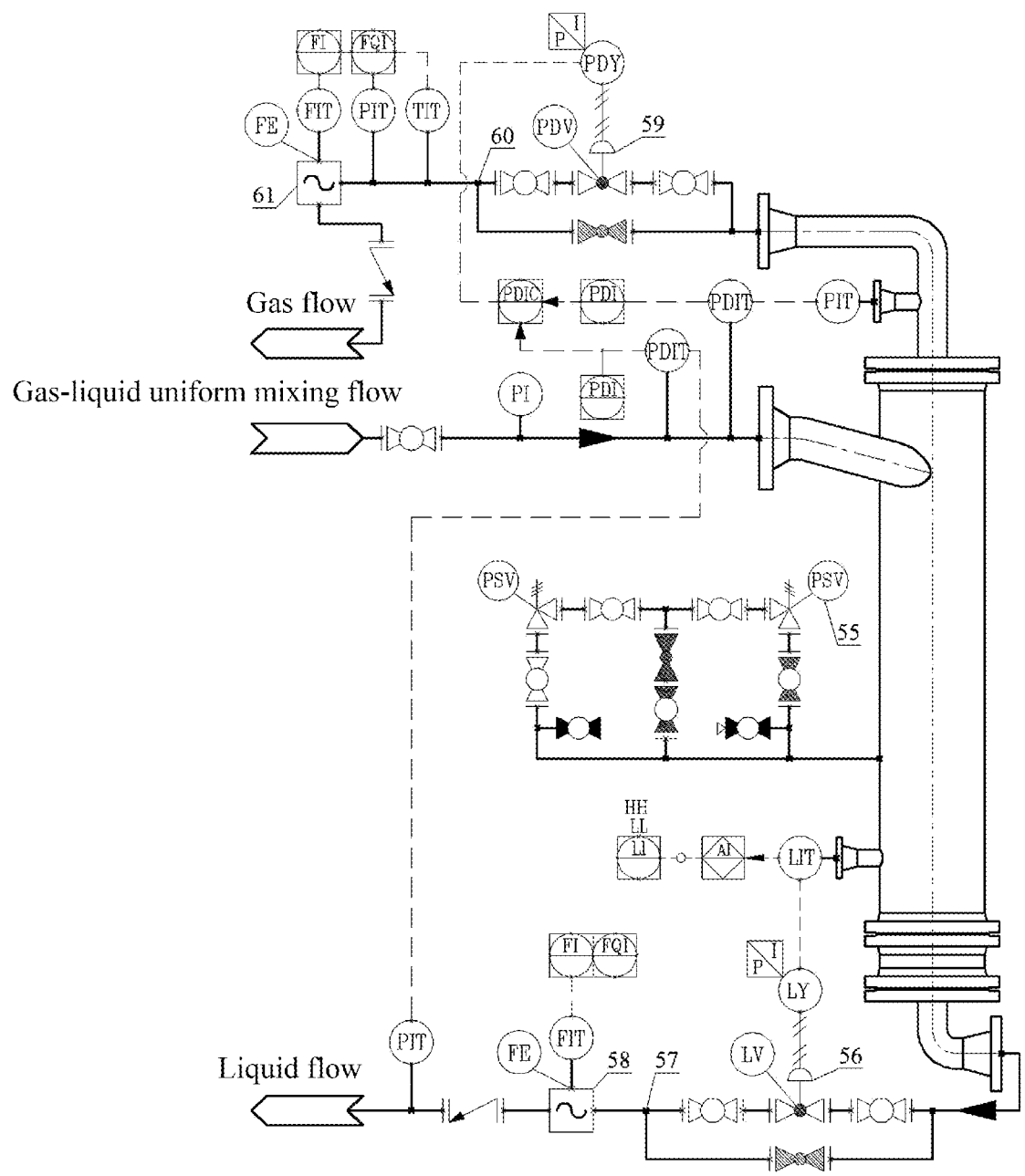
FIG. 13 is a pipeline and instrument control diagram of a gas-liquid separation control system of a separation device with two-stage gas-liquid mixture and conical spiral fields.

In FIG. 13, the pipeline and instrument control method of the gas-liquid separation control system 5 includes the steps as follows. A flow transmitter (FIT) of a liquid outlet manifold 57 transmits a flow signal, which is measured by an ultrasonic liquid flowmeter 58, of degassed liquid flow to an instantaneous flow display instrument (FI) and an accumulated flow display instrument (FQI). A flow transmitter (FIT), a pressure transmitter (PIT) and a temperature transmitter (TIT) of a gas conveying manifold 60 transmit measured flow, pressure and temperature signals of degassed gas flow to an instantaneous flow display instrument (FI) and an accumulated flow display instrument (FQI). A pressure relief valve 55 automatically releases pressure in a pipe cavity of a conical separation pipe 41 under the overpressure working condition. The liquid level transmitter (LIT) of the axial flow liquid collecting pipe section 47 monitors the liquid level condition in the conical separation pipe 41. Conversion between liquid level signals and electric signals and data processing are completed through the liquid level converter (LY). Finally, the flow of the degassed liquid flow is automatically regulated and controlled through the pneumatic liquid level control valve 56 of the liquid outlet manifold 57. Two pressure transmitters (PIT) and two pressure difference transmitters (PDIT) simultaneously monitor the pressure difference condition between the gas collecting pipe 34 and the whirlpool-making liquid inlet pipe 35 and the pressure difference condition between the liquid outlet pipe 44 and the whirlpool-making liquid inlet pipe 35. Conversion between pressure difference signals and gas signals and data processing are completed through a pressure difference indication controller (PDIC) and a pressure difference type gas-electric converter (PDY). The pneumatic quantity of a pneumatic pressure difference control valve 59 on the gas conveying manifold 60 is automatically controlled, and therefore the flow of the degassed gas flow is automatically adjusted.

The above embodiments are only used for explaining the present disclosure, the structure, the connection mode, the online control method and the like of each component can be changed, and equivalent transformation and improvement carried out on the basis of the technical solution of the present disclosure should not be excluded from the protection range of the present disclosure.

What is claimed is:

1. A separation device with two-stage gas-liquid mixture and conical spiral fields, comprising a first-stage uniform mixer, a second-stage uniform mixer, a whirlpool-making gas collector, a conical degasser, a two-stage uniform mixing control system and a gas-liquid separation control system; the second-stage uniform mixer being connected with the conical degasser through the whirlpool-making gas collector, so that the separation device with two-stage gas-liquid mixture and conical spiral fields is formed into an inverted U-shaped pipe network; the two-stage uniform mixing control system and the gas-liquid separation control system being enable of remotely and automatically controlling a process of a first-stage gas-liquid crushing and uniform mixing, a process of a second-stage gas-liquid crushing and uniform mixing, and a gas-liquid efficient separation in the conical spiral fields, wherein the first-stage uniform mixer comprises a first-stage mixing pipe, and an outer micropore ceramic pipe, a middle micropore ceramic pipe, an inner micropore ceramic pipe arranged in the first-stage mixing pipe; the first-stage uniform mixer further comprises an upper partition plate, a lower baffle plate, a liquid inlet buffer pipe and a two-phase liquid inlet pipe from top to bottom; one end of the first-stage mixing pipe connects the upper partition plate through a first flange, another end of the first-stage mixing pipe connects the lower baffle plate and the liquid inlet buffer pipe through a second flange, so as to be integral with the second-stage mixing pipe; and the liquid inlet buffer pipe and the two-phase liquid inlet pipe are connected together by circumferentially welding a lower liquid inlet flange of the liquid inlet buffer pipe and a liquid inlet vertical pipe section of the two-phase liquid inlet pipe; a lower end face of the upper partition plate is milled with first annular clamping grooves which are coaxially distributed into three layers in a radial direction of the upper partition plate, and an upper end face of the lower baffle plate is milled with second annular clamping grooves which are coaxially distributed into three layers in a radial direction of the lower baffle plate; the second-stage uniform mixer comprises a second-stage mixing pipe, and an uniform mixing gear, and an impeller base pipe in the second-stage mixing pipe; the first-stage mixing pipe is communicated with the second-stage mixing pipe through inner flow guide holes of the upper partition plate and outer flow guide holes of the upper partition plate; the liquid inlet buffer pipe is communicated with the first-stage mixing pipe through a flow guide round hole and flow guide holes of the lower baffle plate; the outer micropore ceramic pipe, the middle micropore ceramic pipe and the inner micropore ceramic pipe are coaxially arranged in a layered mode from outside to inside in a radial direction of the first-stage mixing pipe; crushing micropores are provided in respective pipe walls of the outer micropore ceramic pipe, the middle micropore ceramic pipe and the inner micropore ceramic pipe in the axial direction of the first-stage mixing pipe at equal intervals; each of the crushing micropores comprises a large-cone micropore channel, a cylindrical micropore channel and a small-cone micropore channel; annular clamping rings are arranged at two ends of each of the outer micropore ceramic pipe and the inner micropore ceramic pipe; and annular clamping hoops are arranged at two ends of the middle micropore ceramic pipe;

the second-stage uniform mixer further comprises a pressure relief pipe and a uniform mixing flow pipe symmetrically arranged at a top thereof; the pressure relief pipe and the uniform mixing flow pipe are both connected together by circumferentially welding an upper uniform mixing flange; the uniform mixing gear comprises a three-stage uniform mixing teeth; the uniform mixing gear and the impeller base pipe are fixed in the second-stage mixing pipe by interference fit between the three-stage uniform mixing teeth and the second-stage mixing pipe; each stage of the three-stage uniform mixing teeth of the uniform mixing gear comprises two layers of uniform mixing teeth; inclination directions of the two layers of uniform mixing teeth are opposite, and a tooth trace of each of uniform mixing teeth is a combined curve; the uniform mixing gear is arranged in an annular cavity between the impeller base pipe and the second-stage mixing pipe; and a conical boss of the impeller base pipe is provided and configured to axially position the uniform mixing gear and the impeller base pipe;

the whirlpool-making gas collector is configured to adjust gas-liquid uniform mixing flow obtained after two-stage gas-liquid uniform mixing into hollow-core type two-phase spiral flow by a variable-pitch whirlpool-making blade and an upper flow guide conical cover; the whirlpool-making gas collector comprises a gas collecting pipe, and a whirlpool-making liquid inlet pipe, the whirlpool-making variable-pitch blade and a double-layer conical cover arranged on a lower portion of the gas collecting pipe; a wedge-shaped liquid inlet groove is provided at an outlet of the whirlpool-making liquid inlet pipe and is connected with the uniform mixing flow pipe through a third flange; the variable-pitch whirlpool-making blade is fixed into a conical separation pipe by interference fit, an outer contour line of the variable-pitch whirlpool-making blade is a variable-pitch spiral line, and a pitch of the outer contour line of the variable-pitch whirlpool-making blade is gradually reduced from top to bottom; the double-layer conical cover comprises an upper flow guide conical cover and a lower gas collecting conical cover, which are respectively fixed at a lower part and a bottom of a gas collecting vertical pipe section of the gas collecting pipe by circumferential welding; the gas collecting pipe is configured for conveying degassed gas flow; and a gas collecting horizontal pipe section of the gas collecting pipe is connected with the gas collecting vertical pipe section through an elbow;

the conical degasser comprises the conical separation pipe, a flow stabilizing impeller in the conical separation pipe, as well as a liquid outlet buffer pipe and a liquid outlet pipe arranged below the conical separation pipe; the conical separation pipe is sequentially provided with a rotational flow forming pipe section, a rotational flow separating pipe section and an axial flow liquid collecting pipe section from top to bottom in an axial direction of the conical separation pipe; a wedge-shaped separation groove of the rotational flow forming pipe section and the wedge-shaped liquid inlet groove are matched to achieve communication between the conical separation pipe and the whirlpool-making liquid inlet pipe; the axial flow liquid collecting pipe section is configured to form the conical spiral fields, and the flow stabilizing impeller is arranged in a lower and middle part of the axial flow liquid collecting pipe section; the gas collecting pipe and the conical separation pipe are connected together by circumferentially welding the gas collecting vertical pipe section and an upper separation flange fixed to the conical separation pipe; and a bottom of the conical separation pipe is connected with the liquid outlet buffer pipe through a fourth flange; the flow stabilizing impeller comprises flow stabilizing blades and an anti-whirl guide rod, which are configured to adjust degassed liquid flow into liquid flow stably flowing in an axial direction of the conical separation pipe; the flow stabilizing blades are straight plate steel sheets uniformly distributed in a circumferential direction of the conical separation pipe; the flow stabilizing impeller is fixed in the conical separation pipe by interference fit; and the liquid outlet pipe and the liquid outlet buffer pipe are connected together by circumferentially welding a lower separation flange provided on the liquid outlet buffer pipe and a liquid outlet vertical pipe section of the liquid outlet pipe;

a two-phase liquid inlet manifold of the two-stage uniform mixing control system is sequentially provided with an electromagnetic flowmeter, an emergency shut-off valve and a pneumatic pressure control valve; each of the first-stage mixing pipe and the uniform mixing flow pipe is provided with a pressure transmitter;

a liquid outlet manifold of the gas-liquid separation control system is provided with a pneumatic liquid level control valve and an ultrasonic liquid flowmeter; the axial flow liquid collecting pipe section is provided with a liquid level transmitter; a gas conveying manifold is provided with a pneumatic pressure difference control valve and an ultrasonic gas flowmeter; the liquid outlet manifold and the gas collecting pipe are each provided with another pressure transmitter; and the whirlpool-making liquid inlet pipe is provided with two pressure difference transmitters.

2. The separation device with two-stage gas-liquid mixture and conical spiral fields according to claim 1, wherein the first-stage uniform mixer, the second-stage uniform mixer and the conical degasser are vertically arranged; the first-stage uniform mixer and the second-stage uniform mixer are connected through a fifth flange and configured to enable two-stage uniform mixing of gas-liquid two-phase flow with different gas contents; the two-stage uniform mixing control system and the gas-liquid separation control system automatically regulate and control flow rates and flow pressures of the gas-liquid two-phase flow, the gas-liquid uniform mixing flow and the degassed gas flow and the degassed liquid flow.

3. The separation device with two-stage gas-liquid mixture and conical spiral fields according to claim 1, wherein the first-stage uniform mixer is configured to perform the process of the first-stage gas-liquid crushing and uniform mixing by the outer micropore ceramic pipe, the middle micropore ceramic pipe and the inner micropore ceramic pipe; bubbles of relatively large size in the gas-liquid two-phase flow are crushed into smaller bubbles; the first-stage mixing pipe is longer than the liquid inlet buffer pipe; a bottom of the liquid inlet buffer pipe is provided with the lower liquid inlet flange for sealing; and a round hole is drilled in a center of the lower liquid inlet flange;

the upper partition plate and the lower baffle plate are both circular steel plates, cross sections of the annular clamping grooves of each of the upper partition plate and the lower baffle plate are in right trapezoid shapes; the inner flow guide holes uniformly distributed in a circumferential direction of the partition plate are provided between an inner one of the annular clamping grooves of the upper partition plate and a middle one of the annular clamping grooves of the upper partition plate in a radial direction of the upper partition plate; the outer flow guide holes of the upper partition plate uniformly distributed in the circumferential direction of the upper partition plate are provided on an outer edge of an outer one of the annular clamping grooves of the upper partition plate in the radial direction of the upper partition plate; the flow guide round hole is drilled in a center of the lower baffle plate; the flow guide holes of the lower baffle plate uniformly distributed in a circumferential direction of the lower baffle plate are provided between an outer one of the annular clamping grooves and a middle one of the annular clamping grooves of the lower baffle plate in a radial direction of the lower baffle plate; first outer side walls and first inner side walls of the flow guide holes of the lower baffle plate in the radial direction of the baffle plate, second outer side walls and second inner side walls of the inner flow guide holes of the upper partition plate and the outer flow guide holes of the upper partition plate in the radial direction of the upper partition plate are circular arch surfaces; and first two side walls of the flow guide holes of the lower baffle plate in the circumferential direction of the lower baffle plate, second two side walls of the inner flow guide holes of the upper partition plate and the outer flow guide holes of the upper partition plate in the circumferential direction of the upper partition plate are semi-cylindrical surfaces.

4. The separation device with two-stage gas-liquid mixture and conical spiral fields according to claim 1, wherein axial lengths of the outer micropore ceramic pipe, the middle micropore ceramic pipe and the inner micropore ceramic pipe of the first-stage uniform mixer are equal; a cylindrical pipe cavity of the inner micropore ceramic pipe is communicated with the liquid inlet buffer pipe through the flow guide round hole in the lower baffle plate; an annular cavity between the middle micropore ceramic pipe and the inner micropore ceramic pipe is communicated with the second-stage mixing pipe through the inner flow guide holes of the upper partition plate; an annular cavity between the outer micropore ceramic pipe and the middle micropore ceramic pipe is communicated with the liquid inlet buffer pipe through the flow guide holes of the lower baffle plate; an annular cavity between the first-stage mixing pipe and the outer micropore ceramic pipe is communicated with the second-stage mixing pipe through the outer flow guide holes of the upper partition plate; a taper of a conical surface of a hole wall of the large-cone micropore channel is larger than a taper of a conical surface of a hole wall of the small-cone micropore channel; a cone height of the conical surface of the hole wall of the large-cone micropore channel, an axial length of a cylindrical surface of a hole wall of the cylindrical micropore channel, and a cone height of the conical surface of the hole wall of the small-cone micropore channel are gradually increased; the small-cone micropore channel of the outer micropore ceramic pipe is arranged on an inner side of the outer micropore ceramic pipe along a radial direction of the outer micropore ceramic pipe, and the small-cone micropore channel of the inner micropore ceramic pipe is arranged on an inner side of the inner micropore ceramic pipe along a radial direction of the inner micropore ceramic pipe; the small-cone micropore channel of the middle micropore ceramic pipe is arranged on an outer side thereof along a radial direction of the middle micropore ceramic pipe; the annular clamping rings of the outer micropore ceramic pipe are matched with the outer one of the annular clamping grooves of the upper partition plate in the radial direction of the upper partition plate and the outer one of the annular clamping grooves of the lower baffle plate in the radial direction of the lower baffle plate; the annular clamping hoops of the middle micropore ceramic pipe are matched with the middle one of the annular clamping grooves of the upper partition plate in the radial direction of the upper partition plate and the middle one of the annular clamping grooves of the lower baffle plate in the radial direction of the lower baffle plate; the annular clamping rings of the inner micropore ceramic pipe are matched with the inner one of the annular clamping grooves of the upper partition plate in the radial direction of the upper partition plate and the inner one of the annular clamping grooves of the lower baffle plate in the radial direction of the lower baffle plate, such that axial fixation and up-and-down bidirectional limitation of the outer micropore porcelain pipe, the middle micropore porcelain pipe and the inner micropore porcelain pipe are enabled.

5. The separation device with two-stage gas-liquid mixture and conical spiral fields according to claim 3, wherein axial lengths of the outer micropore ceramic pipe, the middle micropore ceramic pipe and the inner micropore ceramic pipe of the first-stage uniform mixer are equal; a cylindrical pipe cavity of the inner micropore ceramic pipe is communicated with the liquid inlet buffer pipe through the flow guide round hole in the lower baffle plate; an annular cavity between the middle micropore ceramic pipe and the inner micropore ceramic pipe is communicated with the second-stage mixing pipe through the inner flow guide holes of the upper partition plate; an annular cavity between the outer micropore ceramic pipe and the middle micropore ceramic pipe is communicated with the liquid inlet buffer pipe through the flow guide holes of the lower baffle plate; an annular cavity between the first-stage mixing pipe and the outer micropore ceramic pipe is communicated with the second-stage mixing pipe through the outer flow guide holes of the upper partition plate; a taper of a conical surface of a hole wall of the large-cone micropore channel is larger than a taper of a conical surface of a hole wall of the small-cone micropore channel; a cone height of the conical surface of the hole wall of the large-cone micropore channel, an axial length of a cylindrical surface of a hole wall of the cylindrical micropore channel, and a cone height of the conical surface of the hole wall of the small-cone micropore channel are gradually increased; the small-cone micropore channel of the outer micropore ceramic pipe is arranged on an inner side of the outer micropore ceramic pipe along a radial direction of the outer micropore ceramic pipe, and the small-cone micropore channel of the inner micropore ceramic pipe is arranged on an inner side of the inner micropore ceramic pipe along a radial direction of the inner micropore ceramic pipe; the small-cone micropore channel of the middle micropore ceramic pipe is arranged on an outer side thereof along a radial direction of the middle micropore ceramic pipe; the annular clamping rings of the outer micropore ceramic pipe are matched with the outer one of the annular clamping grooves of the upper partition plate in the radial direction of the upper partition plate and the outer one of the annular clamping grooves of the lower baffle plate in the radial direction of the lower baffle plate; the annular clamping hoops of the middle micropore ceramic pipe are matched with the middle one of the annular clamping grooves of the upper partition plate in the radial direction of the upper partition plate and the middle one of the annular clamping grooves of the lower baffle plate in the radial direction of the lower baffle plate; the annular clamping rings of the inner micropore ceramic pipe are matched with the inner one of the annular clamping grooves of the upper partition plate in the radial direction of the upper partition plate and the inner one of the annular clamping grooves of the lower baffle plate in the radial direction of the lower baffle plate, such that axial fixation and up-and-down bidirectional limitation of the outer micropore porcelain pipe, the middle micropore porcelain pipe and the inner micropore porcelain pipe are enabled.

6. The separation device with two-stage gas-liquid mixture and conical spiral fields according to claim 1, wherein the second-stage uniform mixer is configured to perform the process of the second-stage gas-liquid crushing and uniform mixing by the uniform mixing gear; the upper uniform mixing flange is arranged on a top of the second-stage mixing pipe for sealing; two round holes are drilled in an outer edge part of the upper uniform mixing flange through which the uniform mixing flow pipe and the pressure relief pipe are passed to be communicated with a pipe cavity of the second-stage mixing pipe; the pressure relief pipe is thinner than the second-stage mixing pipe and the uniform mixing flow pipe;

inner tooth surfaces of the three-stage uniform mixing teeth of the uniform mixing gear are fixed on an outer ring surface of the impeller base pipe by circumferential welding; a cylindrical surface where outer teeth surfaces of the three-stage uniform mixing teeth are located is in interference fit with an inner wall of the second-stage mixing pipe; each layer of uniform mixing teeth of the uniform mixing gear is obliquely arranged; an upper half part of the tooth trace of each uniform mixing tooth is an inwardly concave arc line; a lower half part of the tooth trace of each uniform mixing tooth is an outwardly convex arc line; an area of a cross-section, which is vertical to the tooth trace, of each of the uniform mixing teeth is increased from zero and then continuously decreased to zero; such that the gas-liquid two-phase flow after the process of the first-stage gas-liquid crushing and uniform mixing is continuously sheared and crushed to reduced sizes of the bubbles, the bubbles are further crushed into smaller bubbles, and the gas-liquid two-phase flow is continuously reversed to form gas-liquid uniform mixing flow with the bubbles that are uniformly distributed;

the impeller base pipe is an inverted bowl-shaped pipe body with a closed upper end; an annular cavity is formed by the outer ring surface of the impeller base pipe and the inner wall of the second-stage mixing pipe; and the conical boss is arranged on a top of the impeller base pipe and attached closely to the upper uniform mixing flange.

7. The separation device with two-stage gas-liquid mixture and conical spiral fields according to claim 1, wherein the whirlpool-making gas collector is configured to collect degassed gas flow through the lower gas collecting conical cover; the whirlpool-making liquid inlet pipe is obliquely arranged; a diameter of the whirlpool-making liquid inlet pipe is equal to a diameter of the uniform mixing flow pipe; the gas collecting horizontal pipe section of the gas collecting pipe is horizontally arranged; the gas collecting vertical pipe section of the gas collecting pipe, the conical separation pipe, the liquid outlet buffer pipe and the liquid outlet vertical pipe section of the liquid outlet pipe are coaxially arranged from top to bottom; the lower part of the gas collecting vertical pipe section connects together with the gas collecting pipe and the double-layer conical cover by circumferential welding;

the variable-pitch whirlpool-making blade is an integrated blade; an inner side surface of the variable-pitch whirlpool-making blade is fixed to an outer ring surface of the gas collecting pipe by circumferential welding; a cylindrical surface where an outer side surface of the variable-pitch whirlpool-making blade is located is in interference fit with an inner wall of the rotational flow forming pipe section; an included angle between a tangent line of an upper starting point of the outer contour line of the variable-pitch whirlpool-making blade and a horizontal plane is equal to an included angle between an axis of the whirlpool-making liquid inlet pipe and the horizontal plane; an included angle between a tangent line of a lower ending point of the outer contour line of the variable-pitch whirlpool-making blade and an axis of the conical separation pipe is equal to a taper of the conical surface where an outer ring surface of the upper flow guide conical cover is located; the whirlpool-making liquid inlet pipe is configured to make the gas-liquid uniform mixing flow tangentially flow into the variable-pitch whirlpool-making blade to form a high-speed rotating spiral flow; the upper flow guide conical cover is configured to form a hollow-core type two-phase spiral flow when the high-speed rotating spiral flow tangentially flows to the upper flow guide conical cover;

the double-layer conical cover includes the upper flow guide conical cover and the lower gas collecting conical cover; a taper of the conical surface where an inner ring surface and the outer ring surface of the upper flow guide conical cover are located is larger than that of a conical surface where the inner ring surface and the outer ring surface of the lower gas collecting conical cover are located; a top of the upper flow guide conical cover is connected with a lowest part of the variable-pitch whirlpool-making blade; and the lower gas collecting conical cover is integrally arranged at an upper part of a pipe cavity of the rotational flow separating pipe section.

8. The separation device with two-stage gas-liquid mixture and conical spiral fields according to claim 1, wherein the conical degasser is configured to perform the gas-liquid efficient separation in the conical spiral fields, the variable-pitch whirlpool-making blade is arranged in the rotational flow forming pipe section of the conical separation pipe; the wedge-shaped separation groove is provided in the pipe wall of the rotational flow forming pipe section so as to fix the conical separation pipe with the whirlpool-making liquid inlet pipe by circumferential welding; inner walls of both the rotational flow separating pipe section and the axial flow liquid collecting pipe section are respectively an inverted conical surface and a cylindrical surface; a cross section of a flow channel of the rotational flow separating pipe section is rapidly shrunk to enable an angular momentum of the rotating speed of the hollow-core type two-phase spiral flow to be increased; a rotating speed of the hollow-core type two-phase spiral flow is further increased; a liquid phase in the conical spiral fields with high-speeds is gradually thrown to a pipe wall of the rotational flow separating pipe section and rotates downwards to flow to the axial flow liquid collecting pipe section; and a gas phase is continuously transported to a center of the rotational flow separating pipe section and rises reversely to converge into a long and thin inverted-cone-shaped gas flow.

9. The separation device with two-stage gas-liquid mixture and conical spiral fields according to claim 1, wherein the upper separation flange is arranged on a top of the conical separation pipe for sealing, and a round hole is drilled in a center of the upper separation flange; the liquid outlet pipe is configured for conveying the degassed liquid flow; the liquid outlet buffer pipe is configured to buffer the degassed liquid flow; a bottom of the liquid outlet buffer pipe is provided with the lower separation flange for sealing; and a round hole is drilled in a center of the lower separation flange;

inner side surfaces of the flow stabilizing blades are fixed to an outer ring surface of the anti-whirl guide rod by circumferential welding; and a cylindrical surface where outer side blade surfaces of the flow stabilizing blades are located is in interference fit with an inner wall of the axial flow liquid collecting pipe section.

10. The separation device with two-stage gas-liquid mixture and conical spiral fields according to claim 1, wherein in the two-stage uniform mixing control system, the electromagnetic flowmeter is configured to transmit a measured total flow signal of the gas-liquid two-phase flow to an accumulated flow display instrument through a flow transmitter of the electromagnetic flowmeter, so as to enable metering of the gas-liquid two-phase flow; the pressure transmitter of each of the first-stage mixing pipe and the uniform mixing flow pipe monitors the pressure conditions of the first-stage mixing pipe and the uniform mixing flow pipe; a pressure indication controller and a pressure converter are configured to convert pressure signals into electric signals and process data, and the pneumatic pressure control valve of the two-phase liquid inlet manifold is configured to regulate and control the flow rate of the gas-liquid two-phase flow automatically.

11. The separation device with two-stage gas-liquid mixture and conical spiral fields according to claim 1, wherein in the gas-liquid separation control system, the ultrasonic liquid flowmeter is configured to transmit measured flow signals of the degassed liquid flow to an instantaneous flow display instrument and the accumulated flow display instrument through a flow transmitter of the ultrasonic liquid flowmeter, so as to enable metering of the degassed liquid flow; the ultrasonic gas flowmeter is configured to transmit the measured flow, a pressure and temperature signals of the degassed gas flow to the instantaneous flow display instrument and the accumulated flow display instrument through a flow transmitter, a pressure transmitter and a temperature transmitter of the ultrasonic gas flowmeter respectively, so that metering of the degassed gas flow is enabled; the liquid level transmitter is configured to monitor a liquid level condition in the conical separation pipe; the liquid level converter is configured to convert liquid level signals into electric signals and process data; the pneumatic liquid level control valve of the liquid outlet manifold is configured to automatically regulate and control the flow rate of the degassed liquid flow; the two pressure transmitters of the liquid outlet manifold and the gas collecting pipe; and the two pressure difference transmitters of the whirlpool-making liquid inlet pipe are configured to simultaneously monitor a pressure difference condition between the gas collecting pipe and the whirlpool-making liquid inlet pipe and a pressure difference condition between the liquid outlet pipe and the whirlpool-making liquid inlet pipe; a pressure difference indication controller and a pressure difference type gas-electric converter are configured to convert pressure difference signals into gas signals and process data; a pneumatic quantity of a pneumatic pressure difference control valve on the gas conveying manifold is configured to be automatically controlled; and the flow rate of the degassed gas flow is configured to be automatically adjusted.

\* \* \* \* \*